United States Patent
Hurst et al.

(10) Patent No.: US 9,413,893 B2
(45) Date of Patent: Aug. 9, 2016

(54) SYSTEM, METHOD, APPARATUS, AND COMPUTER PROGRAM PRODUCT FOR PROVIDING MOBILE DEVICE SUPPORT SERVICES

(71) Applicant: Assurant, Inc., New York, NY (US)

(72) Inventors: Cameron E. Hurst, Asheville, NC (US); Cassandra G. Conrad, Naples, FL (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 13/835,206

(22) Filed: Mar. 15, 2013

(65) Prior Publication Data

US 2014/0024348 A1    Jan. 23, 2014

Related U.S. Application Data

(60) Provisional application No. 61/620,795, filed on Apr. 5, 2012.

(51) Int. Cl.
| | |
|---|---|
| *H04M 3/42* | (2006.01) |
| *H04M 3/523* | (2006.01) |
| *G06Q 10/00* | (2012.01) |
| *G06F 11/07* | (2006.01) |
| *H04W 24/04* | (2009.01) |
| *H04L 12/24* | (2006.01) |
| *H04L 29/08* | (2006.01) |

(Continued)

(52) U.S. Cl.
CPC ......... *H04M 3/5232* (2013.01); *G06F 11/0742* (2013.01); *G06F 11/0748* (2013.01); *G06F 11/0793* (2013.01); *G06Q 10/20* (2013.01); *H04L 41/5064* (2013.01); *G06Q 40/08* (2013.01); *H04L 41/0253* (2013.01); *H04L 41/069* (2013.01); *H04L 41/0883* (2013.01); *H04L 41/18* (2013.01); *H04L 41/22* (2013.01); *H04L 41/5074* (2013.01); *H04L 67/22* (2013.01); *H04L 67/24* (2013.01); *H04M 2250/56* (2013.01); *H04W 4/003* (2013.01); *H04W 24/04* (2013.01)

(58) Field of Classification Search
CPC ....... H04W 4/00; H04W 4/003; H04W 4/005; H04W 4/02; H04W 8/18; H04M 3/523; H04M 3/5233; H04M 3/51; H04M 1/24; H04M 3/242
USPC .................. 455/414.1, 423, 424, 425, 550.1; 370/310.2; 379/1.01, 9.01, 9.02, 9.03, 379/265.11, 265.12, 265.13
See application file for complete search history.

(56) References Cited

U.S. PATENT DOCUMENTS

| | | | | |
|---|---|---|---|---|
| 6,014,439 | A | * | 1/2000 | Walker et al. ............. 379/266.01 |
| 6,798,876 | B1 | * | 9/2004 | Bala ......................... 379/265.12 |

(Continued)

OTHER PUBLICATIONS

International Search Report and Written Opinion for Application No. PCT/US13/33503 dated Jun. 10, 2013.

(Continued)

*Primary Examiner* — Steve D Agosta
(74) *Attorney, Agent, or Firm* — Alston & Bird LLP

(57) ABSTRACT

A method is provided for providing mobile device support services. The method may include monitoring a mobile device status. The method may additionally include performing device diagnostics based at least in part on captured deice status data to identify potential faults that may affect mobile device functionality. A corresponding system, apparatus, and computer program product are also provided.

15 Claims, 15 Drawing Sheets

(51) Int. Cl.
  *H04W 4/00* (2009.01)
  *G06Q 40/08* (2012.01)

(56) References Cited

U.S. PATENT DOCUMENTS

| | | |
|---|---|---|
| 7,386,463 B2 | 6/2008 | McCabe |
| 7,974,861 B1 | 7/2011 | Bohanek |
| RE43,031 E * | 12/2011 | Isaka et al. .......... 704/9 |
| 8,135,612 B1 * | 3/2012 | Scudder .......... 705/7.14 |
| 8,230,497 B2 | 7/2012 | Norman et al. |
| 2004/0210658 A1 | 10/2004 | Guillermo et al. |
| 2005/0148329 A1 | 7/2005 | Brunet et al. |
| 2006/0217111 A1 | 9/2006 | Marolia et al. |
| 2007/0288572 A1 | 12/2007 | Busa |
| 2008/0127313 A1 | 5/2008 | Payne et al. |
| 2008/0209255 A1 | 8/2008 | Seguin et al. |
| 2008/0228504 A1 * | 9/2008 | Nguyen et al. .......... 705/1 |
| 2008/0312968 A1 | 12/2008 | Hannon et al. |
| 2009/0094091 A1 * | 4/2009 | Thieret et al. .......... 705/9 |
| 2009/0292700 A1 * | 11/2009 | Castellani et al. .......... 707/6 |
| 2011/0270771 A1 | 11/2011 | Coursimault et al. |
| 2012/0029947 A1 | 2/2012 | Wooldridge et al. |
| 2012/0076283 A1 | 3/2012 | Ajmera et al. |

OTHER PUBLICATIONS

U.S. Appl. No. 13/152,141, filed Jun. 2, 2011, In re: Wooldridge, entitled *Method for Offering a Protection Policy for a Mobile Device*.
Office Action for U.S. Appl. No. 13/152,141 dated Mar. 28, 2013.
Office Action for European Application No. EP 13 77 2924 dated Nov. 13, 2015.
Office Action for Mexican Application No. MX/a/2014/011967 dated Sep. 28, 2015.

* cited by examiner

SYSTEM, METHOD, APPARATUS, AND COMPUTER PROGRAM PRODUCT FOR PROVIDING MOBILE DEVICE SUPPORT SERVICES

CROSS REFERENCE TO RELATED APPLICATIONS

This application claims the benefit of priority to U.S. Provisional Application No. 61/620,795, which was entitled System, Method, Apparatus, and Computer Program Product for Providing Mobile Device Support Services and was filed Apr. 5, 2012 and is hereby incorporated by reference in its entirety.

TECHNOLOGICAL FIELD

Embodiments of the present invention relate generally to computer technology and, more particularly, relate to a system, method, apparatus, and computer program product for providing mobile device support services.

BACKGROUND

As computing technology has continued to advance at a rapid pace, usage of mobile computing devices has become virtually ubiquitous amongst consumers of all socioeconomic classes. Today's mobile computing devices, including smartphones, tablet computing devices, and the like, possess power and capabilities previously only available on the most powerful personal computers. In particular, many mobile computing platforms, such as Apple iOS®, Android®, Windows® Phone, Blackberry®, and the like now enable users to install a variety of applications on their mobile devices. While in some cases these applications may be curated through application stores, quality and integrity reviews of applications available from application stores may not be able to fully guarantee the safety and interoperability of mobile applications. Further still, in many cases, users may download and install applications on their mobile devices from sources other than curated application stores. As such, the quality and relative safety of using some mobile applications is in question.

Additionally, as mobile computing devices approach the same processing power and capabilities as personal computers, the phenomenon of taking a factory fresh device that works as advertised and turning it into a device that performs poorly is occurring with increasing frequency. In this regard, users can load too many, badly behaving or malicious applications and turn their previously working device into a device that appears to be failing. As another example, users may install a combination of applications that are not compatible with each other such that device performance may be severely impacted. Consequently there is the emerging tendency for owners of mobile devices to report their devices with hardware failures where there is no failure at all.

Manufacturers, carriers, mobile network operators, retailers, wholesalers, and other industry providers often carry the financial and customer satisfaction burden resulting from the return of mobile devices with "No Fault Found" or NFF. In most cases, the device must be replaced with a new or refurbished device when the customer is still protected by warranty, extended warranty, insurance, or the like, even if there has not been any hardware failure and the problems experienced by the consumer result entirely from an application(s) installed on the device. In North America and Europe alone this problem is estimated to cost almost $1 billion dollars. The exorbitant cost of the problem of NFF returns results in lower profit margins for industry providers, as well as an increased cost to consumers for mobile devices and mobile device services as a result of industry providers passing on costs of NFF returns to consumers.

BRIEF SUMMARY OF EXAMPLE EMBODIMENTS

Systems, methods, apparatuses and computer program products are provided herein for providing mobile device support services. In this regard, some example embodiments reduce the occurrence of NFF returns by diagnosing and providing solutions for non-hardware issues affecting mobile device performance. Some example embodiments additionally facilitate the diagnosis of and provide suggested solutions for hardware issues. The system of some such example embodiments includes a mobile device support apparatus configured to provide for remote monitoring and/or diagnostics for mobile devices. As such, the mobile device support apparatus provided by some example embodiments provides proactive device monitoring to give mobile device users advance notice of and solutions for potential problems identified on their mobile devices. Additionally or alternatively, the mobile device support apparatus of some example embodiments provides a portal which users may access to facilitate diagnosis of problems encountered with their mobile devices.

Some example embodiments provide a mobile application, which may be implemented on a mobile device. The mobile application of some example embodiments provides a standalone application configured to diagnose and provide solutions for issues potentially affecting mobile device performance. Additionally or alternatively, the mobile application of some example embodiments is configured to work in conjunction with a mobile device support apparatus by monitoring mobile device performance and conveying monitored data to the mobile device support apparatus to facilitate remote analysis and diagnosis of any issues potentially affecting mobile device performance.

Some example embodiments further provide for the identification and elevation of issues that cannot be readily diagnosed and/or that cannot readily be solved without involving a customer service representative and/or that may require physical device repair. In this regard, such example embodiments may facilitate elevation of a support issue to a customer service center such that a human expert that may be more capable of solving a problem may assist a mobile device user. Accordingly, some example embodiments use a combination of remote diagnostic tools, knowledge bases and customer service experts all working in harmony. The system of such example embodiments provides an intelligent engine capable of automatically identifying device performance issues and/or determining the cause of a consumer's complaint about their device's behavior and performance and, where possible, to automatically repair the device, obviating the need for the consumer to return the perceived faulty device. Where it is not possible to repair the device automatically using self-help tools, the system of some example embodiments will make recommendations to the user to escalate the session to a human expert that is potentially more capable of solving the problem.

Some example embodiments also provide a backup and restore functionality for mobile devices. In this regard, some example embodiments provide a mobile device support apparatus configured to maintain a record of applications installed on a mobile device and to facilitate restoration of a mobile device to a last known working condition based on the record and/or to use a record of applications installed on a user's mobile device to configure a new or replacement mobile device acquired by the user. The backup and restore functionality provided by some such example embodiments additionally provides for restoration of modifications made to applications by the user after original application downloads and/or application configuration settings made by the user, and/or device configuration settings made by the user in addition to installing/re-installing the applications.

Some example embodiments additionally provide a destruction process that may be triggered to lock and/or wipe memory of lost or stolen mobile devices. Accordingly, such example embodiments facilitate protection of personal data from theft or misuse by unauthorized third parties who may acquire lost or stolen devices.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
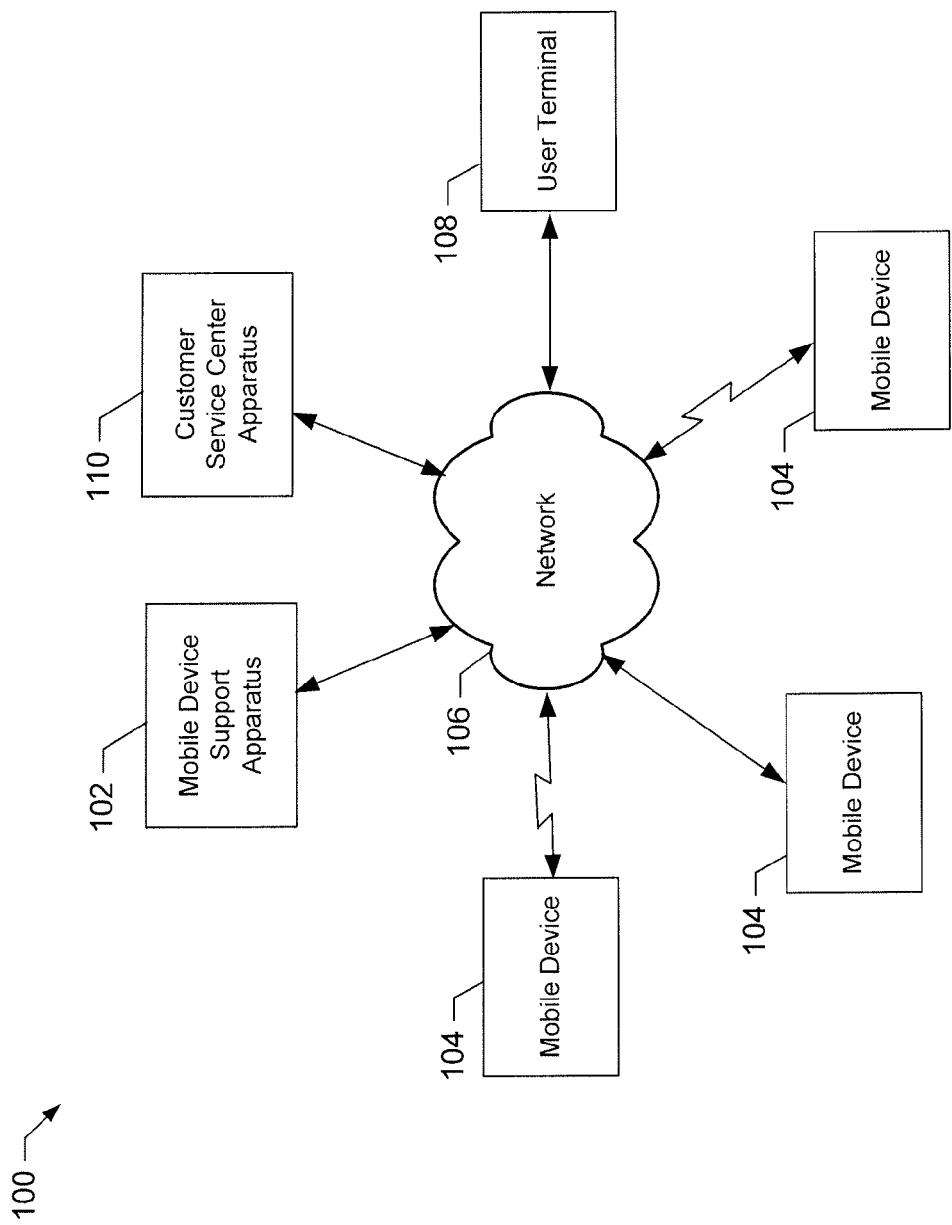
Figure 2:
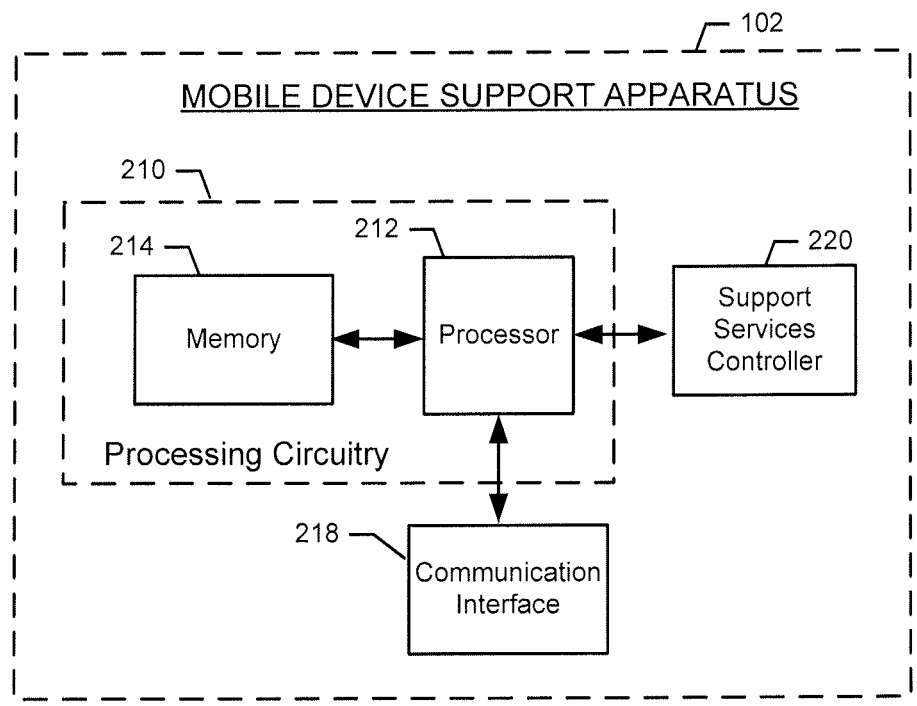
Figure 3:
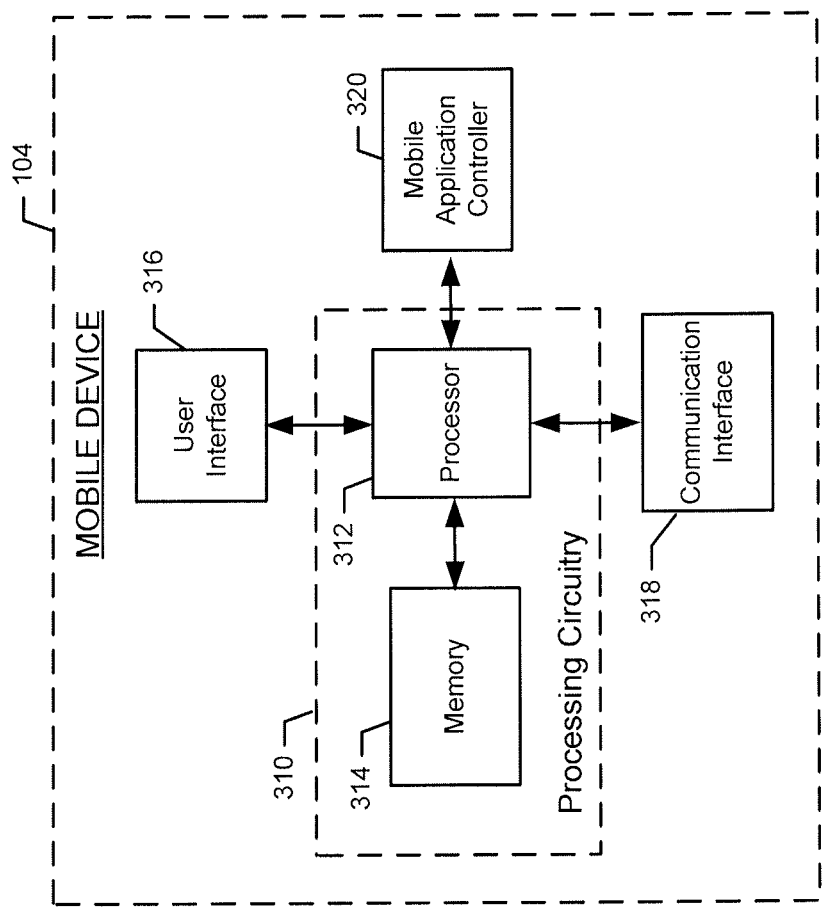
Figure 4:
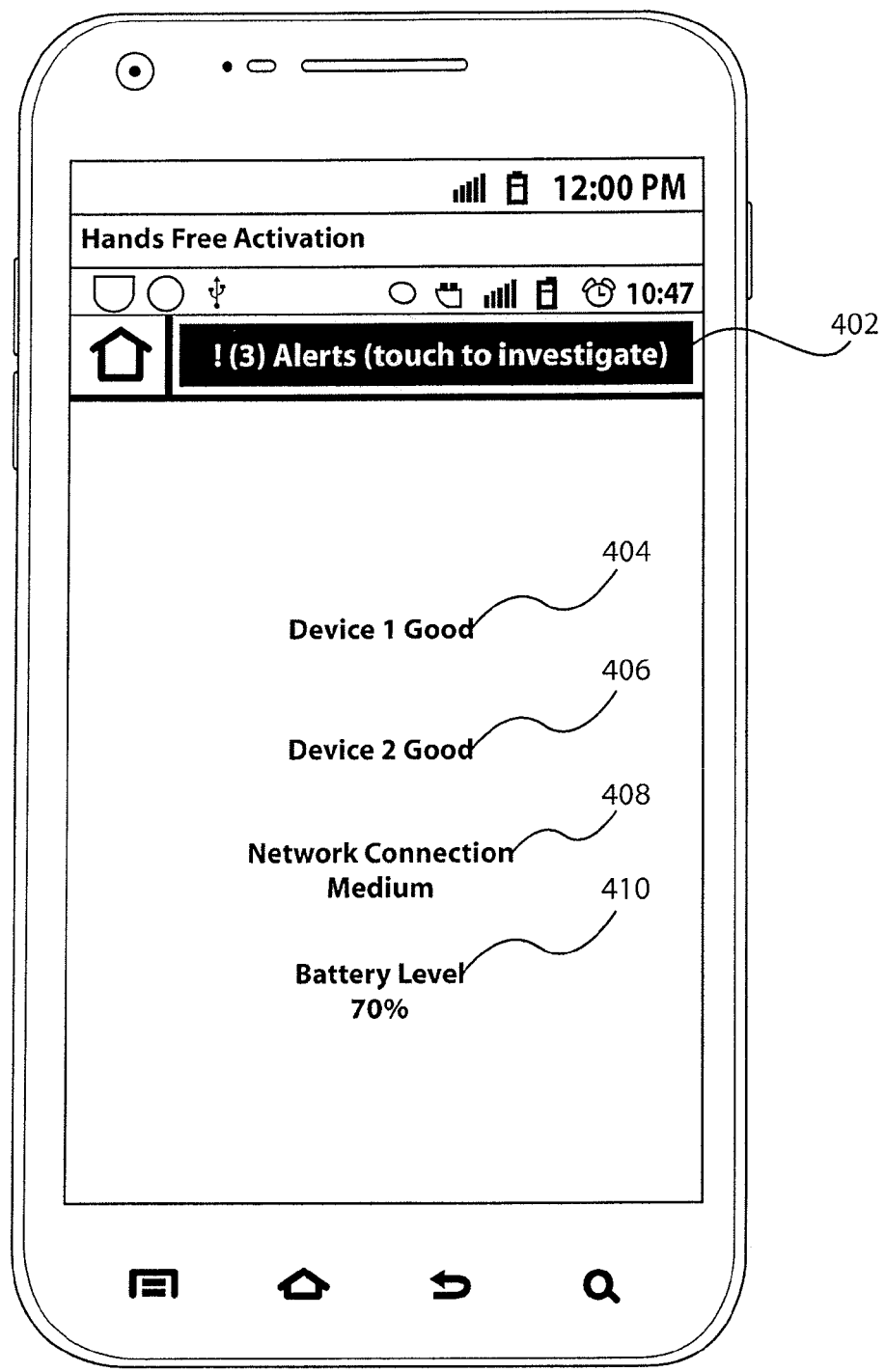
Figure 5:
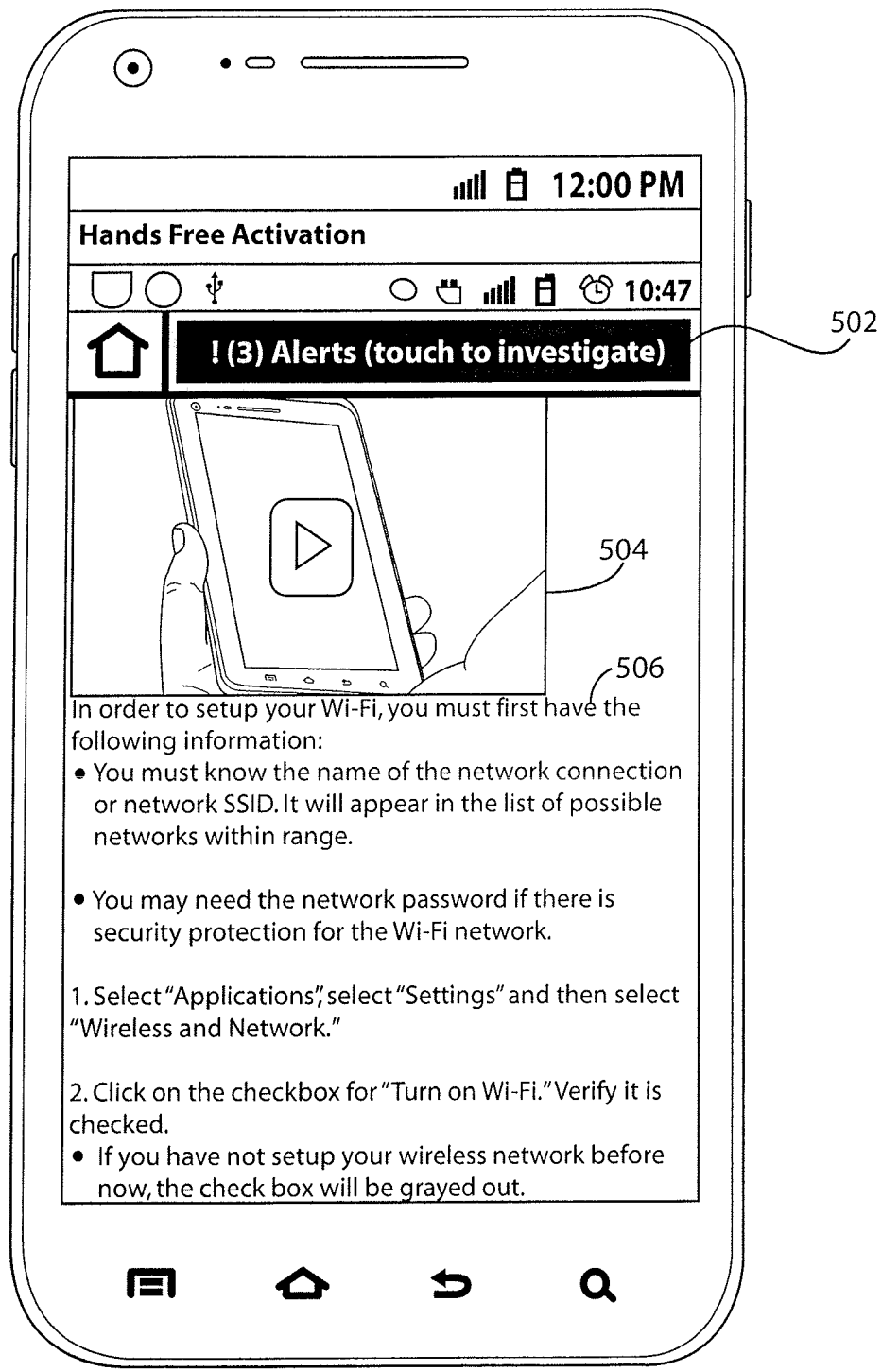
Figure 6:
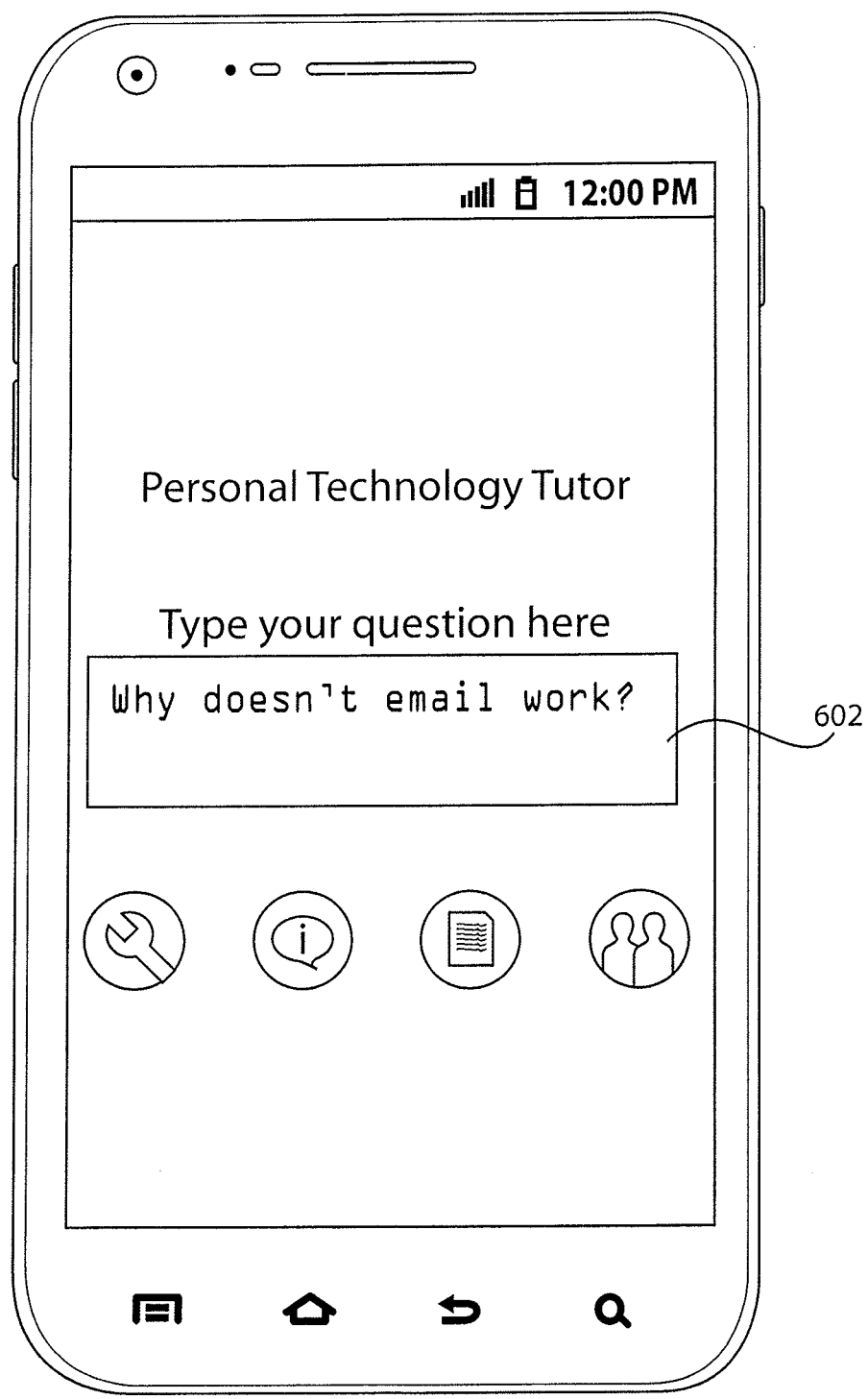
Figure 11:
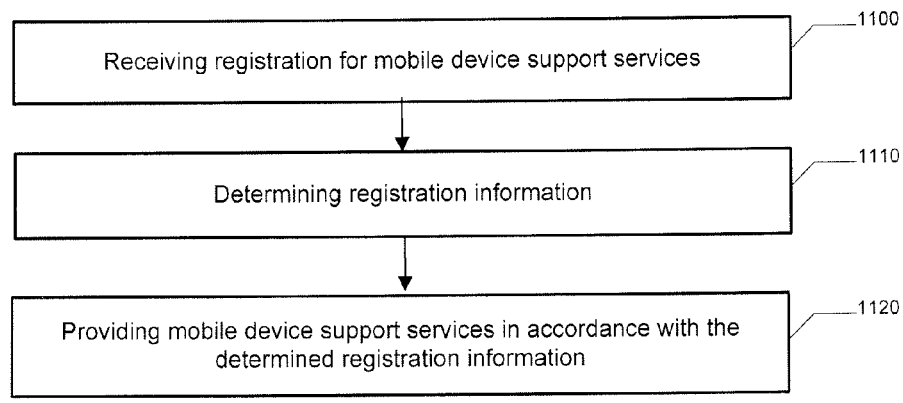
Figure 12:
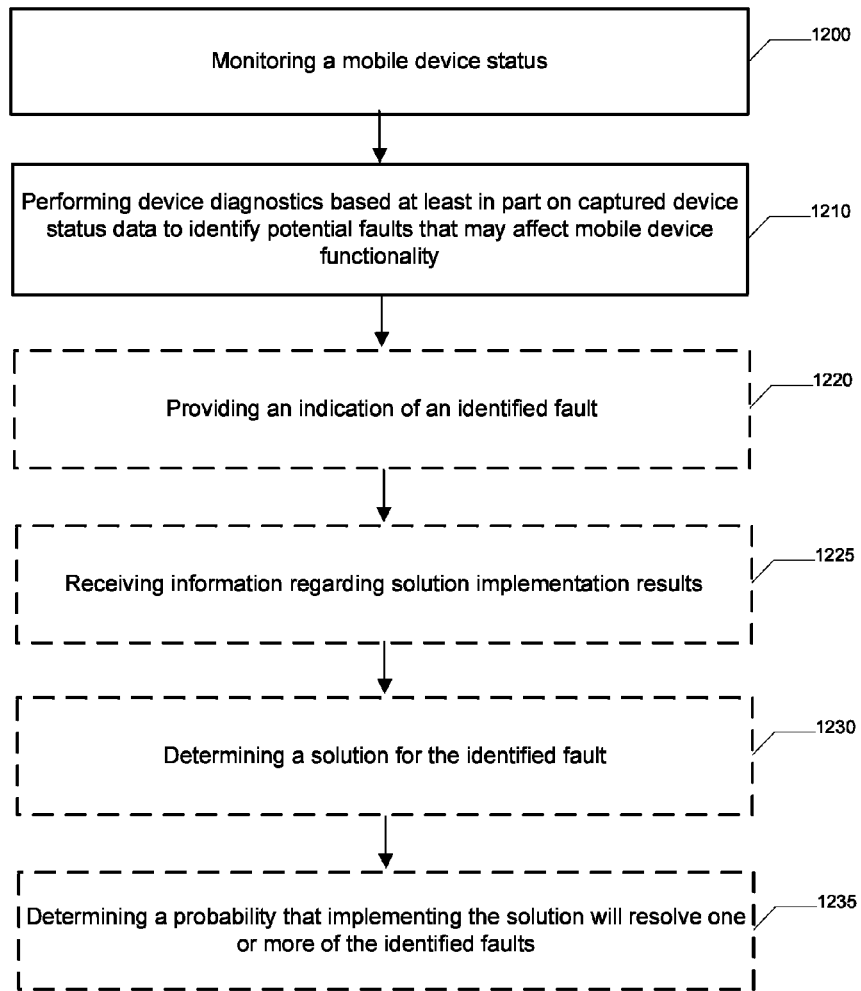
Figure 13:
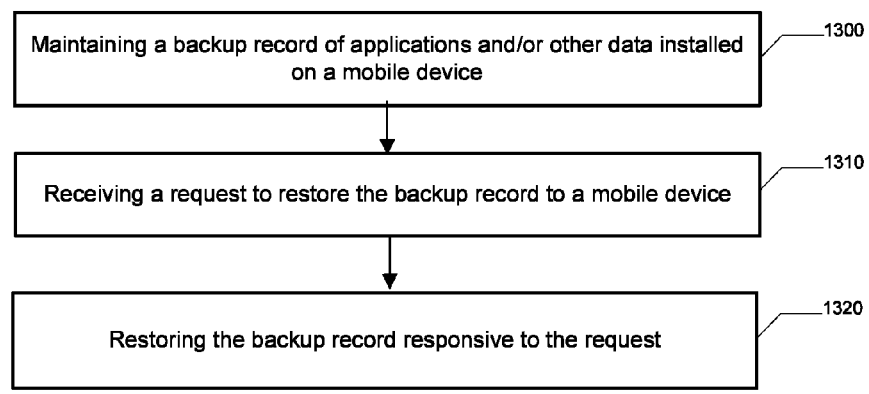
Figure 14:
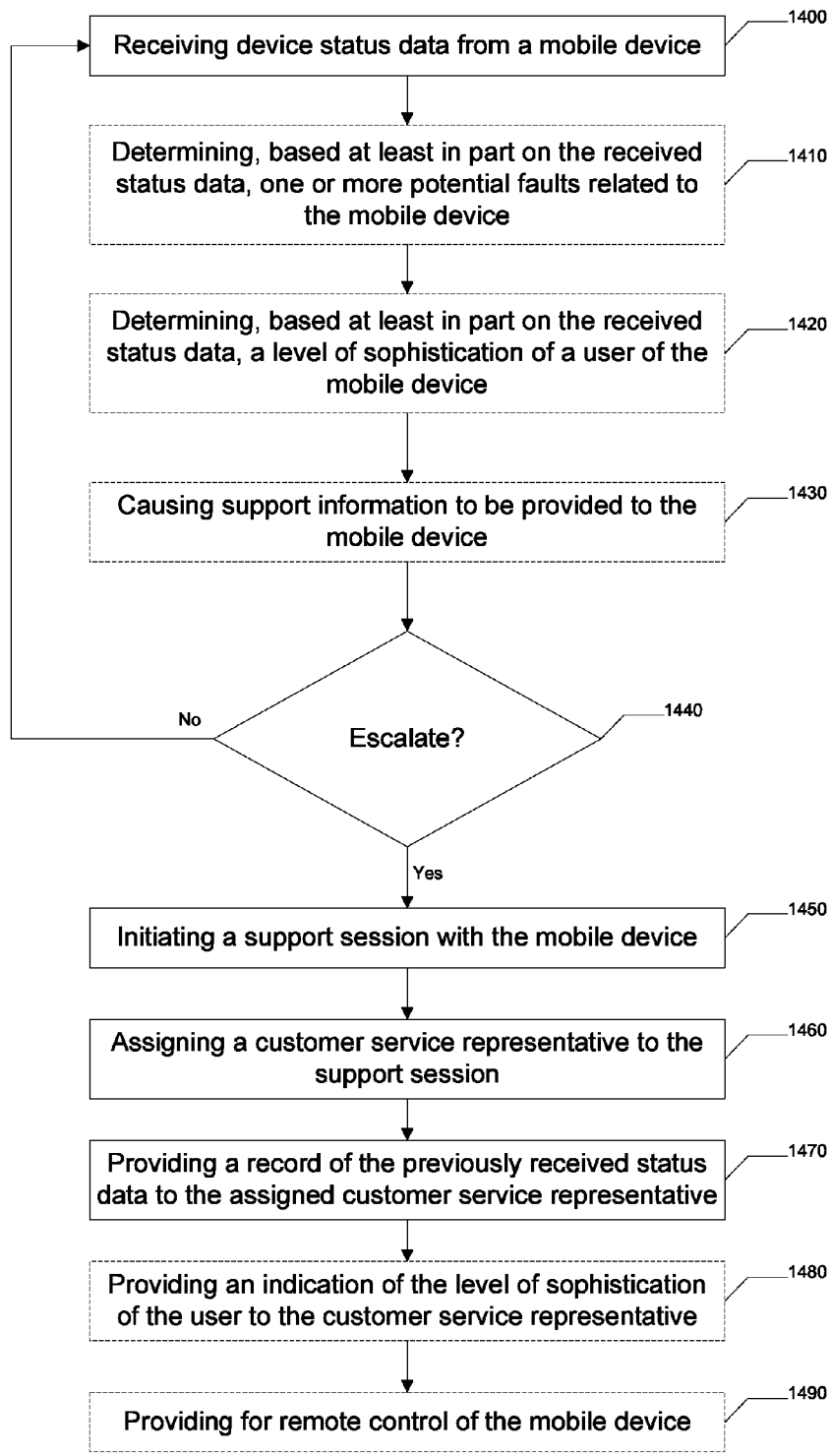
Figure 15:
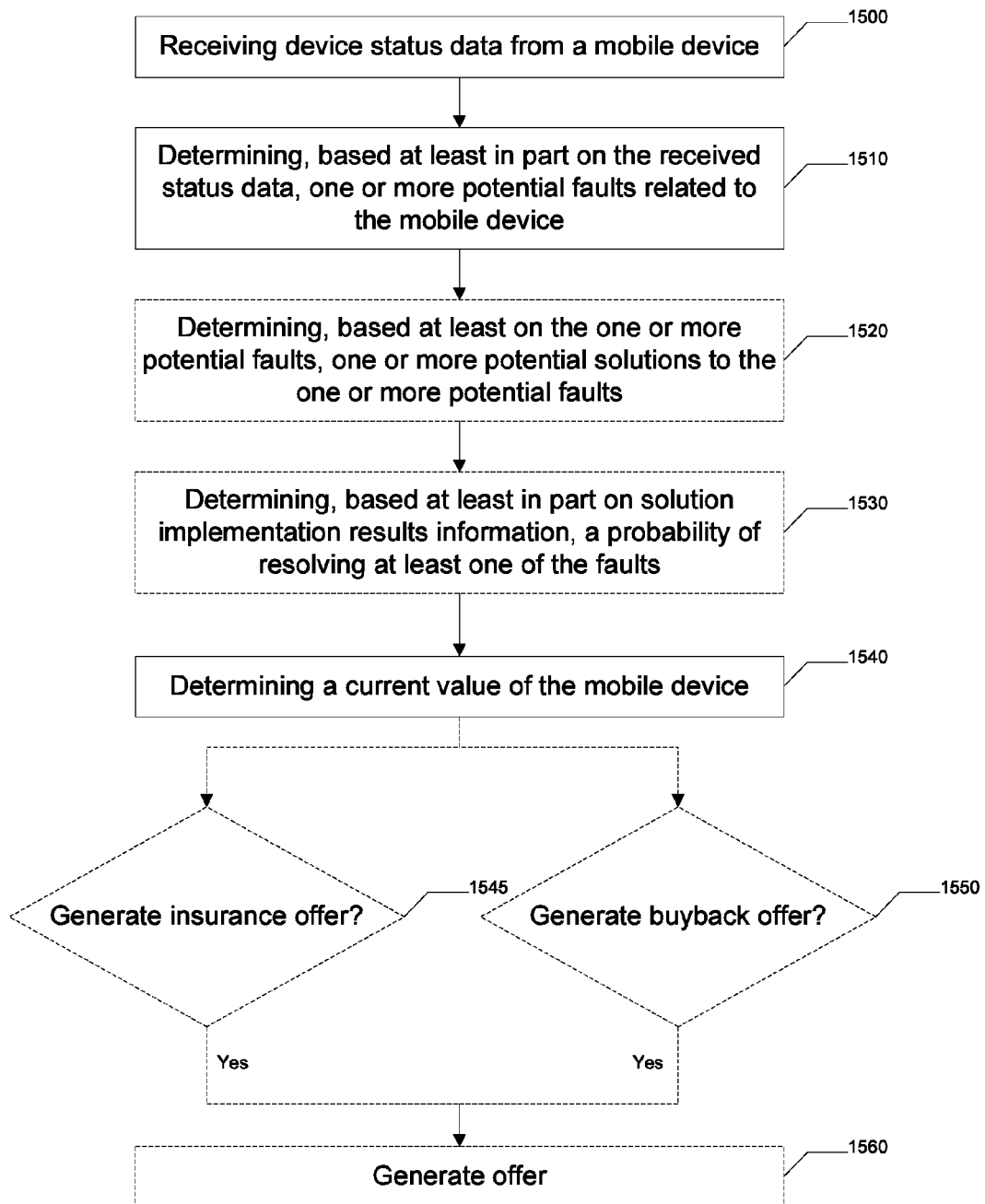

Having thus described embodiments of the invention in general terms, reference will now be made to the accompanying drawings, which are not necessarily drawn to scale, and wherein:

FIG. 1 illustrates a system for providing mobile device support services according to some example embodiments;

FIG. 2 illustrates a block diagram of a mobile device support apparatus in accordance with some example embodiments;

FIG. 3 illustrates a block diagram of a mobile device in accordance with some example embodiments;

FIG. 4 illustrates an example diagnostics alert interface that may be provided in accordance with some example embodiments;

FIG. 5 illustrates an example diagnostics and solution user interface that may be provided in accordance with some example embodiments;

FIG. 6 illustrates an example user interface for enabling a user to access device support services in accordance with some example embodiments;

FIGS. 7-10 illustrate example user interfaces for a mobile device support portal provided in accordance with some example embodiments;

FIG. 11 illustrates a flowchart according to an example method for providing mobile device support services according to some example embodiments;

FIG. 12 illustrates a flowchart according to an example method for performing device diagnostics according to some example embodiments;

FIG. 13 illustrates a flowchart according to an example method for providing backup and restore services according to some example embodiments;

FIG. 14 illustrates a flowchart according to an example method for providing a support session according to some example embodiments; and FIG. 15 illustrates a flowchart according to an example method for determining a valuation and one or more offers associated with a mobile device according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

System Overview

FIG. 1 illustrates a system 100 for providing mobile device support services according to some example embodiments. It will be appreciated that the system 100 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing mobile device support services, numerous other configurations may also be used to implement embodiments of the present invention.

The system 100 may include a mobile device support apparatus 102, which may be configured to provide mobile device support services to one or more mobile devices 104 via the network 106 in accordance with one or more example embodiments disclosed herein. The mobile device support apparatus 102 may comprise one or more servers, a server cluster, one or more network nodes, a cloud computing infrastructure, one or more desktop computers, one or more laptop computers, some combination thereof, or the like.

As illustrated in FIG. 1, the system 100 may include one or more mobile devices 104. While three such mobile devices 104 are illustrated in FIG. 1, it will be appreciated that this illustration is by way of example, and not by way of limitation, as the system 100 may include additional or fewer mobile devices 104. A mobile device 104 may be embodied as any mobile computing device, such as by way of non-limiting example, a cellular phone, smart phone, mobile communication device, tablet computing device, digital camera/camcorder, mobile audio/video player, mobile digital video recorder, any combination thereof, or the like.

In various example embodiments, a mobile device 104 may be configured to connect to the network 106 via a variety of wireless and/or wireline connections. For example, a mobile device 104 may be configured to access the network 106 via a cellular connection, wireless local area network connection, Ethernet connection, and/or the like. As such, the network 106 may comprise a wireline network, wireless network (e.g., a cellular network, wireless local area network, wireless wide area network, some combination thereof, or the like), or a combination thereof, and in some example embodiments comprises at least a portion of the Internet.

In some example embodiments, the mobile device support apparatus 102 and a mobile device 104 may be configured to communicate with each other over the network 106 to facilitate provision by the mobile device support apparatus 102 of mobile device support services to the mobile device 104 in accordance with one or more example embodiments. The mobile device support apparatus 102 may, for example, be maintained by a wireless carrier, mobile device manufacturer, mobile device warranty provider, mobile device insurance provider, and/or other entity that may provide support services to mobile device users.

The system 100 of some example embodiments may include one or more user terminals 108. A user terminal 108 may comprise any computing device that may be used to communicate with the mobile device support apparatus 102 by way of the network 106. In this regard, in some example embodiments, a user terminal 108 may be used to access a website and/or other support portal that may be delivered remotely by the mobile device support apparatus 102 of some example embodiments to a user terminal 108 over the network 106 to enable a user to access support services for a mobile device 104. By way of non-limiting example, a user terminal 108 may comprise a desktop computer, laptop computer, mobile device, workstation, or the like.

In some example embodiments, the system 100 may additionally comprise a customer service center apparatus 110. The customer service center apparatus may comprise any computing device or plurality of computing devices that may be used by a wireless carrier, mobile device manufacturer, mobile device warranty provider, mobile device insurance provider, and/or other entity to facilitate the provision of live customer service to a mobile device user. As an example, the customer service center apparatus 110 may be implemented at a call center or other support center that may be staffed with one or more customer service representatives that may communicate with mobile device users via telephone call, voice over internet protocol (VoIP), web chat, text chat, email, video call, and/or other communication technology that may be used to facilitate communication between a mobile device user and a customer service representative.

In some embodiments including a customer service center apparatus 110, the mobile device support apparatus 102 may be configured to communicate with the customer service center apparatus 110, such as via the network 106. As another example, in some example embodiments, the mobile device support apparatus 102 and customer service center apparatus 110 may be co-located on a common computing device or group of computing devices such that the mobile device support apparatus 102 and customer service center apparatus 110 may directly communicate with each other. In embodiments including a customer service center apparatus 110, the mobile device support apparatus 102 may be configured to communicate with the customer service center apparatus 110 in order to escalate a device support session to a human customer service representative, provide a record of previously gathered device diagnostic information for a mobile device 104 to the customer service center apparatus 110 such that it is accessible via a customer service representative during a live device support session, provide a record of corrective actions already performed by a user of the mobile device 104, and/or the like. The customer service center apparatus 110 of some example embodiments may be further configured to communicate with a mobile device 104 and/or user terminal 108 to facilitate communication between a customer service representative and a mobile device user during a live device support session.

FIG. 2 illustrates a block diagram of a mobile device support apparatus 102 in accordance with some example embodiments. However, it should be noted that the components, devices or elements illustrated in and described with respect to FIG. 2 below may not be mandatory and thus some may be omitted in certain embodiments. Additionally, some embodiments may include further or different components, devices or elements beyond those illustrated in and described with respect to FIG. 2.

Referring now to FIG. 2, the mobile device support apparatus 102 may include or otherwise be in communication with processing circuitry 210 that is configurable to perform actions in accordance with one or more example embodiments disclosed herein. In this regard, the processing circuitry 210 may be configured to perform and/or control performance of one or more functionalities of the mobile device support apparatus 102 in accordance with various example embodiments, and thus may provide means for performing functionalities of the mobile device support apparatus 102 in accordance with various example embodiments. The processing circuitry 210 may be configured to perform data processing, application execution and/or other processing and management services according to one or more example embodiments. In some embodiments, the mobile device support apparatus 102 or a portion(s) or component(s) thereof, such as the processing circuitry 210, may be embodied as or comprise a chip or chip set. In other words, the mobile device support apparatus 102 or the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile device support apparatus 102 or the processing circuitry 210 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 210 may include a processor 212 and, in some embodiments, such as that illustrated in FIG. 2, may further include memory 214. The processing circuitry 210 may be in communication with or otherwise control a communication interface 218 and/or a support services controller 220. As such, the processing circuitry 210 may be embodied as a circuit chip (e.g., an integrated circuit chip) configured (e.g., with hardware, software or a combination of hardware and software) to perform operations described herein.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of the mobile device support apparatus 102 as described herein. The plurality of processors may be embodied on a single computing device or distributed across a plurality of computing devices collectively configured to function as the mobile device support apparatus 102. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as the mobile device support apparatus 102. The memory 214 may be configured to store information, data, applications, instructions and/or the like for enabling the mobile device support apparatus 102 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents or data sets. Among the contents of the memory 214, applications may be stored for execution by the processor 212 in order to carry out the functionality associated with each respective application. In some cases, the memory 214 may be in communication with one or more of the processor 212, communication interface 218, or support services controller 220 via a bus(es) for passing information among components of the mobile device support apparatus 102.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable the mobile device support apparatus 102 to communicate with a mobile device(s) 104, user terminal(s) 108, customer service center apparatus 110, and/or other computing device via the network 106. Accordingly, the communication interface 218 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the processor 212 (or the processing circuitry 210) may be embodied as, include, or otherwise control a support services controller 220. As such, the support services controller 220 may be embodied as various means, such as circuitry, hardware, a computer program product comprising computer readable program instructions stored on a computer readable medium (for example, the memory 214) and executed by a processing device (for example, the processor 212), or some combination thereof. The support services controller 220 may be capable of communication with one or more of the memory 214 or communication interface 218 to access, receive, and/or send data as may be needed to perform one or more of the functionalities of the support services controller 220 as described herein.

FIG. 3 illustrates a block diagram of a mobile device 104 in accordance with some example embodiments. However, it should be noted that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

Referring now to FIG. 3, the mobile device 104 may include or otherwise be in communication with processing circuitry 310 that is configurable to perform actions in accordance with one or more example embodiments disclosed herein. In this regard, the processing circuitry 310 may be configured to perform and/or control performance of one or more functionalities of the mobile device 104 in accordance with various example embodiments, and thus may provide means for performing functionalities of the mobile device 104 in accordance with various example embodiments. The processing circuitry 310 may be configured to perform data processing, application execution and/or other processing and management services according to one or more example embodiments. In some embodiments, the mobile device 104 or a portion(s) or component(s) thereof, such as the processing circuitry 310, may be embodied as or comprise a chip or chip set. In other words, the mobile device 104 or the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile device 104 or the processing circuitry 310 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 310 may include a processor 312 and, in some embodiments, such as that illustrated in FIG. 3, may further include memory 314. The processing circuitry 310 may be in communication with or otherwise control a user interface 316, a communication interface 318, and/or a mobile application controller 320. As such, the processing circuitry 310 may be embodied as a circuit chip (e.g., an integrated circuit chip) configured (e.g., with hardware, software or a combination of hardware and software) to perform operations described herein.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 312 may comprise a plurality of processors. The plurality of processors may be in operative communication with each other and may be collectively configured to perform one or more functionalities of the mobile device 104 as described herein. In some example embodiments, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform one or more operations described herein.

In some example embodiments, the memory 314 may include one or more non-transitory memory devices such as, for example, volatile and/or non-volatile memory that may be either fixed or removable. In this regard, the memory 314 may comprise a non-transitory computer-readable storage medium. It will be appreciated that while the memory 314 is illustrated as a single memory, the memory 314 may comprise a plurality of memories. The memory 314 may be configured to store information, data, applications, instructions and/or the like for enabling the mobile device 104 to carry out various functions in accordance with one or more example embodiments. For example, the memory 314 may be configured to buffer input data for processing by the processor 312. Additionally or alternatively, the memory 314 may be configured to store instructions for execution by the processor 312. As yet another alternative, the memory 314 may include one or more databases that may store a variety of files, contents or data sets. Among the contents of the memory 314, applications may be stored for execution by the processor 312 in order to carry out the functionality associated with each respective application. In some cases, the memory 314 may be in communication with one or more of the processor 312, user interface 316, communication interface 318, or mobile application controller 320 via a bus(es) for passing information among components of the mobile device 104.

The user interface 316 may be in communication with the processing circuitry 310 to receive an indication of a user input at the user interface 316 and/or to provide an audible, visual, mechanical or other output to the user. As such, the user interface 316 may include, for example, a keyboard, a mouse, a joystick, a display, a touch screen display, a microphone, a speaker, and/or other input/output mechanisms. As such, the user interface 316 may, in some example embodiments, provide means for a user to access and interact with mobile device support services provided by the mobile device support apparatus 102 in accordance with various example embodiments.

The communication interface 318 may include one or more interface mechanisms for enabling communication with other devices and/or networks. In some cases, the communication interface 318 may be any means such as a device or circuitry embodied in either hardware, or a combination of hardware and software that is configured to receive and/or transmit data from/to a network and/or any other device or module in communication with the processing circuitry 310. By way of example, the communication interface 318 may be configured to enable the mobile device 104 to communicate with the mobile device support apparatus 102 and/or other computing device via the network 106. Accordingly, the communication interface 318 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the processor 312 (or the processing circuitry 310) may be embodied as, include, or otherwise control a mobile application controller 320. As such, the mobile application controller 320 may be embodied as various means, such as circuitry, hardware, a computer program product comprising computer readable program instructions stored on a computer readable medium (for example, the memory 314) and executed by a processing device (for example, the processor 312), or some combination thereof. The mobile application controller 320 may be capable of communication with one or more of the memory 314, user interface 316, or communication interface 318 to access, receive, and/or send data as may be needed to perform one or more of the functionalities of the mobile application controller 320 as described herein. In accordance with some example embodiments, the mobile application controller 320 may provide means for implementing and controlling functionality of a mobile application that may be configured to provide mobile device support services, run diagnostics on the mobile device 104, and/or interact with the mobile device support apparatus 102 and/or customer service center apparatus 110 in accordance with various example embodiments.

Having now generally described several embodiments of the system 100, mobile device support services that may be provided by the system 100 will now be described in accordance with several example embodiments.

Diagnostic and Repair Services

Some example embodiments offer mobile device diagnostic and repair services facilitating the reduction in occurrence of NFF returns. In accordance with various example embodiments, these services may, for example, be provided by the mobile device support apparatus 102 under the control of the support services controller 220, by a mobile application operating under the control of the mobile application controller 320, and/or some combination thereof.

In some example embodiments, a user may register, or opt-in, to receiving mobile device support services, such as may be provided in accordance with some example embodiments. Registration in some example embodiments may, for example, comprise a proactive user action of registering via a web portal, such as may be provided by the mobile device support apparatus 102 and accessible via a mobile device 104 and/or via a user terminal 108, registering via a mobile application that may be implemented on the mobile device 104, and/or the like. As another example, in some example embodiments, registration may occur automatically responsive to user enrollment in a device protection plan for a mobile device 104, purchase of a device warranty for the mobile device 104, purchase of the mobile device 104, and/or the like.

In some embodiments, registration information may be provided by the user and/or otherwise determined during the registration process, such as by the support services controller 220 and/or mobile application controller 320. This registration information may comprise information enabling and/or otherwise configuring the provision of device support services, such as diagnostic and repair services, in accordance with various example embodiments. The registration information may, for example, include information about the mobile device 104, such as a manufacturer of the mobile device 104, a model of the mobile device 104, an operating system running on the mobile device 104, and/or the like. Additionally or alternatively, the registration information may comprise user consent for the performance of one or more services, such as monitoring of a status of the mobile device 104, collection of status data captured through the monitoring, and/or the like. The registration information may additionally or alternatively comprise configuration settings for governing the provision of device support services. The support services controller 220 and/or mobile application controller 320 may be configured to determine the registration information, and may be configured to provide one or more device support services disclosed herein in accordance with the registration information. The user may be enabled to later update registration information, such as configuration settings and/or permissions that may govern the provision of device support services, following registration.

In some example embodiments, the mobile application controller 320 may be configured to monitor a status of a mobile device 104 to collect device status data related to a status of the mobile device 104. The monitoring may, for example, be performed periodically, on an ongoing basis, aperiodically, in accordance with a schedule, on demand, and/or the like. In this regard, the mobile application controller 320 may be configured to proactively to automatically monitor a status of the mobile device 104 and/or may be configured to monitor a status of the mobile device 104 on-demand in response to a user request. In some example embodiments, monitoring by the mobile application controller 320 may be performed under the control of and/or with the assistance of the mobile device support apparatus 102. Monitoring may, for example, be performed with the assistance of one or more sensors that may be implemented on the mobile device 104 and/or that may otherwise be queried by the mobile device 104. By way of non-limiting example, these sensor may include a touch screen sensor, key actuation sensor (e.g., for a keypad/keyboard), Global Positioning System (GPS) sensor, accelerometer, battery level sensor, battery capacitance sensor, battery temperature sensor, network signal strength sensor, and/or the like.

In some example embodiments, monitoring of a status of a mobile device 104 may be performed in accordance with configuration settings that may be user configured and/or automatically defined, such as during registration for device support services. For example, configuration settings may define the type(s) of device status data captured in the course of the monitoring. In this regard, in some example embodiments, monitoring may be tailored to capture only designated device status data. As another example, configuration settings may guide the timing of status monitoring, frequency of status monitoring, and/or the like. In some example embodiments, monitoring may be configured automatically, such as through heuristic analysis, and/or in accordance with user-defined configuration settings to occur during periods of low utilization of the mobile device 104, such as overnight. In this regard, potential strain on or conflict with usage of device resources during periods in which the mobile device 104 is being utilized may be reduced, or even eliminated, by avoiding performance of device monitoring concurrently with user utilization of the mobile device and/or during periods in which device resources may be used by other applications. In some example embodiments, monitoring may be configured to be performed during periods in which the mobile device 104 is connected to an external power resource, such as when a battery of the mobile device 104 may be charging, and/or when there is at least a threshold amount of power remaining in a battery that may power the mobile device 104 of some example embodiments.

In various example embodiments, a variety of device status data may be captured through monitoring of the status of a mobile device 104. As one example, an application profile may be determined, which may include the applications installed on the mobile device 104, configuration settings for installed applications, processor and/or memory usage of installed applications, crash logs, execution and/or usage data, and/or the like. In this regard, an application profile may provide a snapshot of the applications installed on a mobile device 104 and/or a state thereof at a given point in time. In some example embodiments, a series of application profiles may be determined over time, and those application profiles may be maintained, such as in memory 214 and/or in memory 314. The series of application profiles may be used to facilitate device diagnostics, such as to identify a newly installed application, a modified application setting, and/or the like that may have impacted device performance. As another example, an application profile may be used to facilitate restoration of a mobile device to a last known working or other previous state, as will be described further herein below in accordance with some example embodiments.

In some example embodiments, device status data that may be captured through monitoring of a device status may comprise data regarding hardware implemented on the mobile device 104. For example, information may be captured regarding hardware usage, such as, by way of non-limiting example, memory usage, processor usage, and/or the like. Hardware usage data may include a snapshot(s) of hardware usage illustrating a usage at one or more points in time and/or a usage trend illustrating usage over a period of time. As a further example, captured status information may include information on power consumption, battery usage, battery, battery discharge rates, and/or the like, which may, for example, define an instantaneous rate of power consumption, instantaneous rate of battery discharge, a rate of power consumption over time, a rate of battery discharge over time, and/or the like. As another example, information may be captured regarding hardware health, such as information regarding a health of a battery, memory device, device sensors, accelerometer, Global Positioning Service sensor, and/or other hardware that may be implemented on a mobile device 104. Information regarding hardware health may, for example, include hardware test results that may provide information indicative of hardware health.

In accordance with some example embodiments, captured device status data may additionally or alternatively include information regarding device settings, system log contents, application log contents, and/or other data elements. As yet another example, captured device status data may include information on usage of a mobile device 104. For example, information regarding network utilization (e.g., utilization of the network 106), call history information, text message history information, data regarding a quantity of data transferred over time, and/or the like may be captured through device status monitoring in accordance with some example embodiments. As a still further example, captured device status data may include: information regarding radio signals associated with, e.g., transmitted or received by, the mobile device; information regarding the occurrence of events associated with the mobile device; information regarding battery usage of the mobile device; information regarding overall or per app data usage of the mobile device; information regarding corrective actions performed by the user, such as support content accessed by the user and/or corrective actions performed by the user.

In some example embodiments, captured device status data may be at least temporarily maintained locally on a mobile device 104, such as in memory 314. Additionally or alternatively, in some example embodiments, at least a portion of captured device status data for a mobile device 104 may be conveyed to the mobile device support apparatus 102, where it may be maintained in memory 214. Device status data conveyed to the mobile device support apparatus 102 may be pre-processed in some example embodiments to eliminate personal data and/or other sensitive data, such as may particularly identify a user. In embodiments in which device status data is maintained at the mobile device support apparatus 102, the device status data may be maintained in a record, such as database, in association with a respective mobile device 104 from which it was captured, a device user, and/or other identifier that may be used to facilitate correlation of device status data with a device and/or device user.

In embodiments in which captured device status data is conveyed to the mobile device support apparatus 102, the device status data may be transferred in accordance with configuration settings that may define a time period during which the data is sent to the mobile device support apparatus 102. For example, device status data may be provided to the mobile device support apparatus 102 during periods of low utilization of the mobile device 104, such as overnight. As another example, device status data may be provided to the mobile device support apparatus 102 during periods in which the mobile device 104 is connected to an external power resource, such as when a battery of the mobile device 104 may be charging, and/or when there is at least a threshold amount of power remaining in a battery that may power the mobile device 104 of some example embodiments. As still a further example, device status data may be provided to the mobile device support apparatus 102 during periods of lower usage of the network 106 so as to manage the data load on the network 106. As yet another example, in embodiments in which an operator of the network 106 may charge for data transfer, device status data may be provided to the mobile device support apparatus 102 during periods of lower data rates.

In some example embodiments, such as in embodiments in which a user registers to receive device support services, periodic messages indicative of the types of device status data captured through monitoring to ensure that the user is aware of and agrees to the capture settings. The periodic messages may include a re-opt-in option so that a user may reconfirm his or her agreement and/or may provide an option to adjust configuration settings to tailor status monitoring and device status data capture settings to his or her preference.

In some example embodiments, captured device status data may be used to perform device diagnostics for a mobile device 104 in order to identify potential faults that may affect the mobile device 104. The device diagnostics may, for example, be used to determine a predicted fault that has a non-zero probability of affecting the device in the future, or a present fault which may already be affecting the device. In some example embodiments, diagnostics may be performed entirely on the mobile device 104, such as by an application executing under the control of the mobile application controller 320. Additionally or alternatively, in some example embodiments, device diagnostics may be performed by the support services controller 220 through performance of remote diagnostics on the mobile device 104 and/or based at least in part on device status data for the mobile device 104 that may be provided to the mobile device support apparatus 102 by the mobile device 104. As still a further example, in some example embodiments, device diagnostics may be performed both onboard the mobile device 104 and on the mobile device support apparatus 102.

In performing device diagnostics, a variety of analytic techniques, heuristic techniques, and/or the like may be used to analyze collected device status data. In some example embodiments, device diagnostics may be performed based on a knowledge base, such as may be stored on and/or otherwise accessible to the mobile device support apparatus 102 and/or mobile device 104. In some example embodiments, device diagnostics may be performed based on device status data, fault history data, and/or other data that may be collected by the mobile device support apparatus 102 from a plurality of mobile devices. In this regard, some example embodiments identify trending issues, such as poorly behaving and malicious applications, applications that frequently crash, frequently encountered application-device incompatibility issues, conflicts between applications, and/or the like. Accordingly, in some example embodiments, the support services controller 220 may be configured to aggregate device status data collected from a plurality of mobile devices and analyze the collected data to identify trends that may be used when performing device diagnostics on a particular mobile device 104. In this regard, the some example embodiments may provide an intelligent learning ability to enable improved diagnostics on the basis of device status data collected from and diagnostics performed on mobile devices in the system 100. Accordingly, device diagnostics may be performed on the basis of individual device datasets and/or aggregated data to identify potential faults, such as trending issues, poorly behaving applications, malicious applications (e.g., "malware"), conflicting applications and/or the like.

According to another example embodiment, one or more fault profiles may be determined based on the collected device status data. Each of the fault profiles may, for example, comprise information regarding device configurations, such as installed applications, device settings, usage characteristics, or the like, which have been determined, such as based on the aggregated data discussed above, to either give rise to, or increase the probability of giving rise to, one or more device faults. Accordingly, such fault profiles may additionally comprise statistical information, such as a probability that a particular device configuration or a particular aspect of a device configuration would give rise to one or more particular faults, or an identified incompatibility between one or more installed applications. These fault profiles may be stored, for example, in a record, such as a database. Thus, according to example embodiments employing such fault profiles, potential faults may be determined for a particular mobile device based at least in part on a comparison between device status data received from the mobile device and one or more fault profiles. According to a further example embodiment, potential faults may be determined for a particular mobile device based at least in part on a comparison between one or more application profiles for the mobile device and one or more fault profiles.

In some example embodiments, device diagnostics may be performed based at least in part on one or more characteristics associated with the mobile device 104. For example, diagnostics may take into account device type (e.g., device manufacturer, device model, and/or the like), device operating system (e.g., operating system type, operating system version, and/or the like), and/or other device characteristics may be factored into the performance of device diagnostics. In this regard, in some example embodiments, device diagnostics tailored to specific characteristics of a mobile device 104 may be performed. In embodiments in which device status data aggregated from multiple devices and/or knowledge base data is used to perform device diagnostics, device diagnostics may be performed on the basis of data related to devices having identical or at least substantially similar characteristics.

A variety of potential faults may be identified through performance of device diagnostics in accordance with various example embodiments. For example, an application loaded on a mobile device contributing to the observation of poor device performance and behavior may be identified. In this regard, some example embodiments may identify an application consuming excessive resources, such as network bandwidth, messaging, processing resources, memory resources, file system resources, and/or the like over time. Additionally or alternatively, some example embodiments may identify applications having a demonstrated history of instability, such as may be determined through scanning system logs for errors/exceptions and/or that may be determined to frequently crash and/or require frequent restart. As still a further example, a poorly performing application may be identified based at least in part on application of a rules engine to identify applications exhibiting undesirable behavior. As yet another example, resource access history, resource access permissions, and/or resource access requests may be analyzed to identify applications that may be accessing insecure resources and/or resources that the applications should not be accessing. As an even further example, conflicting applications may be identified via any of the operations discussed immediately above and, additionally or alternatively, on the basis of a comparison of a change between two successive application profiles, as discussed below.

According to an example embodiment, device diagnostics may be used to determine one or more performance indications for a mobile device. These performance indications may then, for example, be provided to the mobile device, such as along with benchmark performance indications so as to allow comparison. For example, one or more benchmark performance indications may be determined for one or more new mobile devices of a particular model and these benchmark performance indications may be provided to mobile device of the same model. According to another example, benchmark performance indications may be determined for one or more mobile devices configured with the same operating system or which belong to the same device ecosystem. In this way, information regarding potential faults may be provided in the form of indications of how a particular device's performance compares to certain benchmark performance indications.

According to some example embodiments, indicia of various application characteristics may be determined for applications loaded on a mobile device. For example, indicia of security characteristics of an application, such as whether the application attempts to access root level commands or can write to external storage, may be determined As another example, indicia of privacy characteristics of an application, such as whether the application can access a user's contacts or can upload log information, may also or alternatively be determined As yet another example, indicia of performance characteristics of an application, such as memory requirements of the application or whether the application runs one or more processes or services at startup may be determined These indicia may, for example, comprise scores, ratings, or the like, and may, according to example embodiments, be provided to the mobile device.

In some example embodiments, identification of malware or other poorly behaving application may, for example be made on the basis of a comparison of a change between two successive application profiles captured for a mobile device (e.g., an application profile captured before a problem was observed and an application profile captured after a problem was observed). In some example embodiments, system logs and/or application logs may be analyzed to identify applications that frequently crash, have memory leaks, and/or cause other issues. In embodiments in which aggregated data from multiple mobile devices is leveraged for performing device diagnostics, diagnostics performed on the basis of a data set for an individual device may be corroborated against and/or compared to other devices running the same application(s) to determine whether an application is causing performance issues or other faults on a device. In some example embodiments, hardware faults, such as may require physical repair or replacement of a mobile device or component thereof may be identified.

Figure 9:
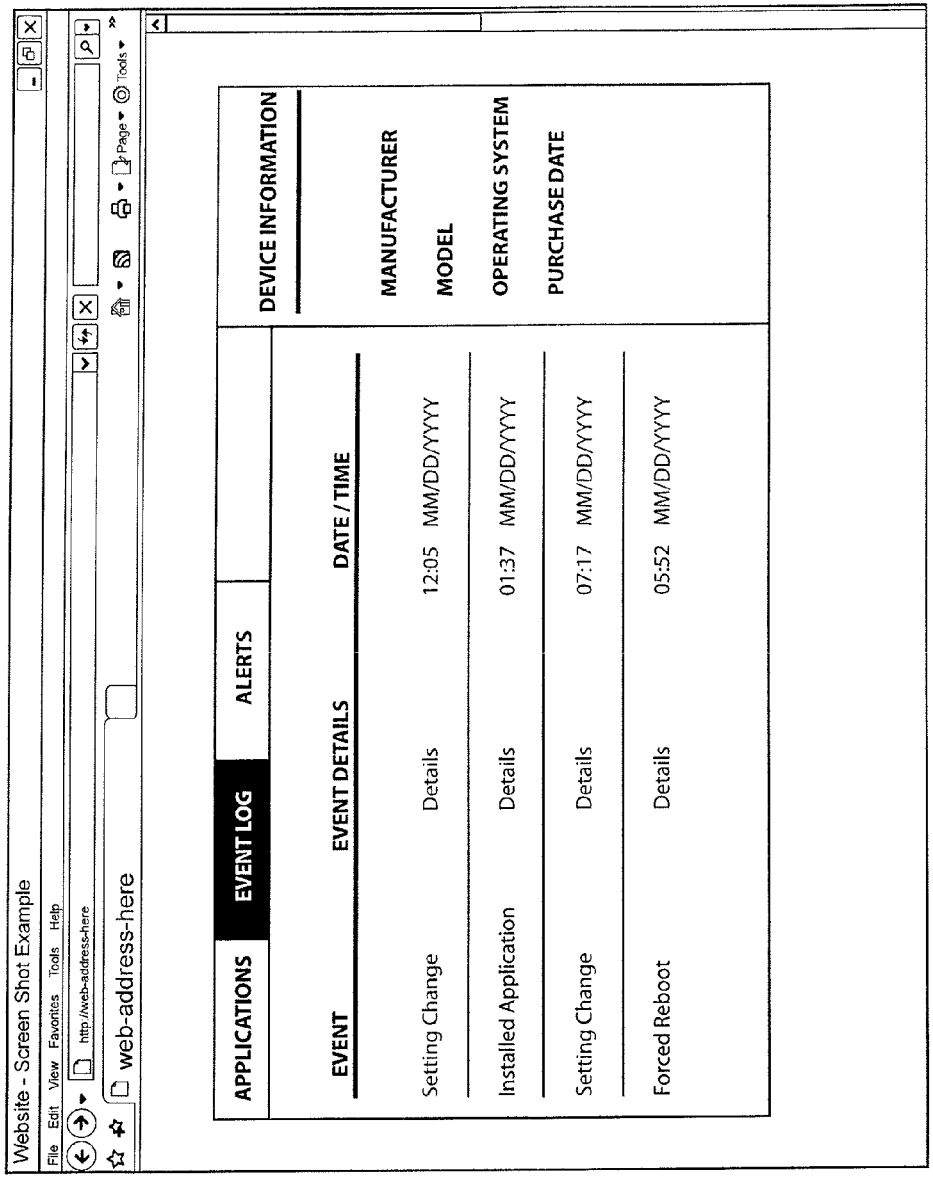
Figure 10:
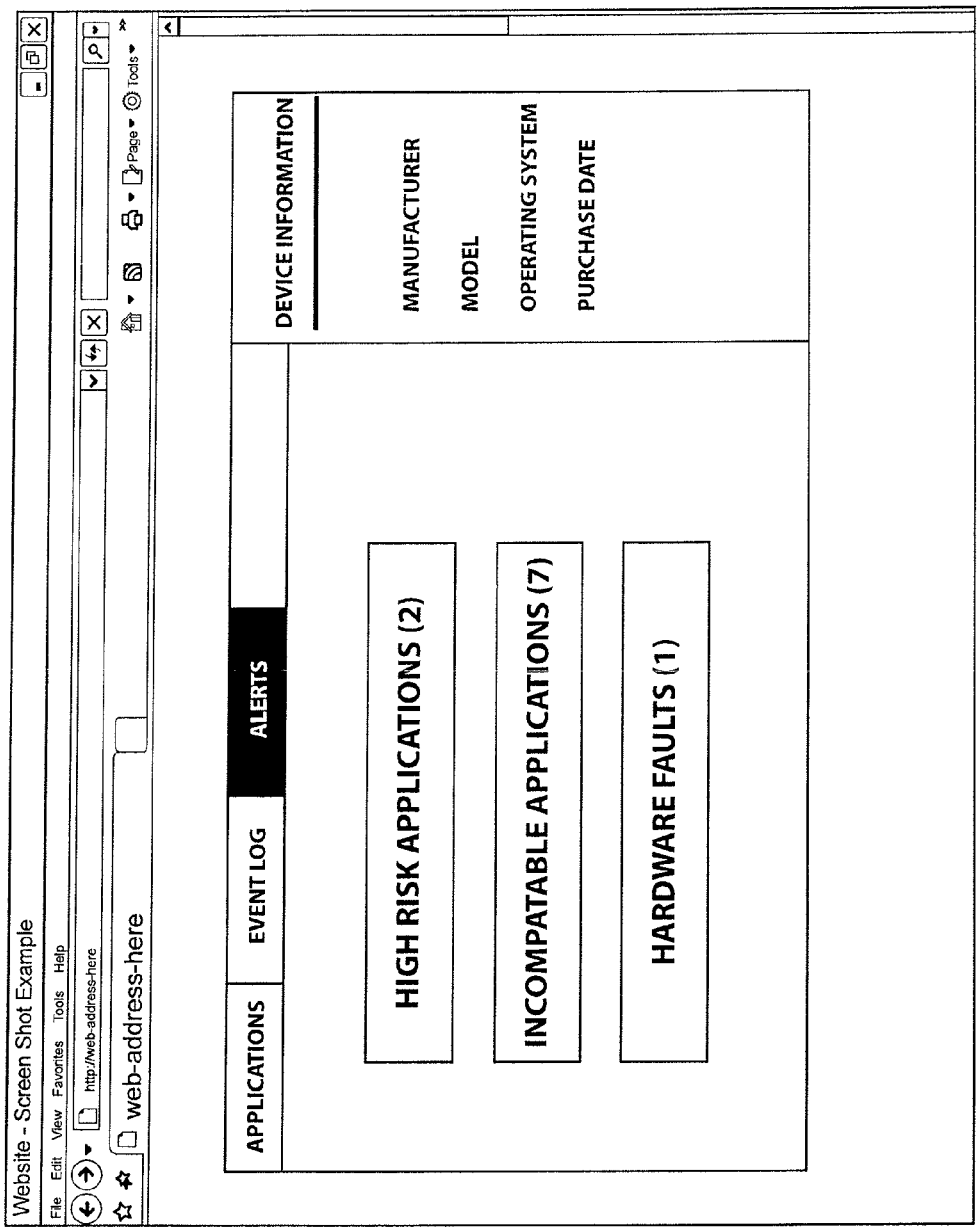

In some example embodiments, an indication of the identified fault may be provided to a user of the mobile device 104 in an instance in which a potential fault is identified from performance of device diagnostics on a mobile device 104. As an example, an alert notification, such as a graphical notification and/or an audible notification, indicative of an identified fault may be provided via the user interface 316, such as under the direction of the support services controller 220 and/or the mobile application controller 320. Examples of alert notifications that may be provided via a mobile device application are illustrated in FIG. 4, FIG. 5, and FIG. 10, which are described further herein below. Additionally or alternatively, an alert indicative of an identified fault may be provided to a user via a web portal that may be provided by the mobile device support apparatus 102 and accessible to a user via the mobile device 104 and/or a user terminal 108. Examples of alerts that may be provided via a web portal are illustrated in FIG. 9 and FIG. 10, which are described further herein below.

In some example embodiments, the support services controller 220 and/or the mobile application controller 320 may be configured to determine a solution, e.g., a potential solution, for an identified fault. As will be appreciated, the determined solution may vary based upon the type of fault identified. For example, a solution may comprise removal of a malicious or incompatible application that may be affecting device performance. As another example, a solution may comprise installation of an application or application update that may patch or otherwise resolve an issue. As still a further example, in an instance in which a fault may not be readily resolved through remote repair or user action, a suggested solution may comprise instructing the user to return the device to a sales outlet or service center for repair or replacement.

According to an example embodiment, solutions may be determined based at least in part on solution implementation result information. The solution implementation results may include, for example, information about whether implementing a particular solution in a particular mobile device caused one or more faults associated with that mobile device to be resolved. Solution implementation results received from a plurality of mobile devices may, like the device status data, be aggregated and this aggregated data may be used in device diagnostics and/or solution determinations. Thus, one or more solutions may be determined based at least in part on the collected device status data.

According to another example embodiment, one or more fault profiles may be determined based on the information regarding solution implementation results received from one or more mobile devices. Each of the fault profiles may, for example, comprise information regarding device configurations, such as installed applications, device settings, usage characteristics, or the like, which have been determined, such as based on the aggregated data discussed above, to either give rise to, or increase the probability of giving rise to, one or more device faults. Accordingly, such fault profiles may additionally comprise probability information, such as a probability that a particular device configuration or a particular aspect of a device configuration would give rise to one or more particular faults. These fault profiles may be stored, for example, in a record, such as a database. Thus, according to example embodiments employing such fault profiles, potential faults may be determined for a particular mobile device based at least in part on a comparison between device status data received from the mobile device and one or more fault profiles. According to a further example embodiment, potential faults may be determined for a particular mobile device based at least in part on a comparison between one or more application profiles for the mobile device and one or more fault profiles.

In some instances, the solution may be automatically performed to remedy the fault. For example, identified malware may be automatically removed from the mobile device 104 in some example embodiments. Additionally or alternatively, a user may be prompted with a list of one or more identified solutions and may be asked to confirm that he or she wishes for an identified solution to be performed. For example, a mobile application operating under control of the mobile application controller 320 may prompt a user with an identified solution via the user interface 316 and provide the user with the option to implement the solution. As another example, a user may elect to implement an identified solution via a web portal interface that may be provided by the mobile device support apparatus 102 of some example embodiments.

FIG. 4 illustrates an example diagnostics alert interface that may be provided in accordance with some example embodiments. In this regard, FIG. 4 illustrates an example user interface that may be provided on a user's mobile device 104 indicating device diagnostics results in accordance with some example embodiments. It will be appreciated, however, that the example user interface illustrated in FIG. 4, as well as those illustrated in FIGS. 5-10 are each provided by way of example, and not by way of limitation. In this regard, embodiments disclosed herein may provide user interfaces having alternative selection, arrangement, and/or presentation of elements compared to those illustrated in the example user interface screen captures of FIGS. 4-10.

Referring to FIG. 4, the presentation of device diagnostic results may include an indication 402 of alerts relating to potential faults identified through performance of device diagnostics. The user may select to view and investigate the alerts, such as by touching the indication 402 in embodiments in which the user interface is illustrated on a touch screen display. In this regard, the user may be presented with more detail about the identified potential faults and/or proposed solutions for the identified faults. The user interface may additionally provide a summary of items analyzed through performance of device diagnostics, along with an indication of whether the item passed (e.g., a check mark, text description of results, and/or other indication) or failed (e.g., an "X," text description of the results, and/or other indication) the diagnostics. In the example of FIG. 4, the indications 404 and 406 respectively indicate that the health of "Device 1" and "Device 2" is "good." It will be appreciated that "Device 1" and "Device 2" may each comprise any device that may be implemented on a mobile device, including a processor, memory device, Universal Serial Bus port, network adaptor, and/or the like. The example indication 408 indicates the network connection strength (e.g., "medium"). The example indication 410 indicates a power level remaining in the battery (e.g., "70%").

FIG. 5 illustrates an example diagnostics and solution user interface that may be provided in accordance with some example embodiments. In this regard, FIG. 5 illustrates an example user interface that may be provided on a user's mobile device 104. The example user interface of FIG. 5 includes an indication 502 of alerts relating to potential faults identified through performance of device diagnostics. The user may select to view and investigate the alerts, such as by touching the indication 402 in embodiments in which the user interface is illustrated on a touch screen display. In this regard, the user may be presented with more detail about the identified potential faults and/or proposed solutions for the identified faults. The example user interface of FIG. 5 may also include support information for enabling the user to resolve a problem or fault, such as may have been identified through performance of device diagnostics. In the example of FIG. 5, support information is provided for enabling a user to set up a Wi-Fi connection. This support information may include an instructional video 504. The video 504 may, for example, be provided to the user's mobile device over the network 106 by the mobile device support apparatus 102, such as by streaming. The support information may also include instructions 506, which may provide step-by-step instructions for resolving an issue.

FIG. 6 illustrates an example user interface for enabling a user to access device support services in accordance with some example embodiments. The user interface of FIG. 6 may, for example, be provided by a mobile application that may be implemented on a mobile device 104 and/or may be accessed via a web interface that may be provided by the mobile device support apparatus 102. The example user interface of FIG. 6 may include a form 602 enabling a user to enter a question or help topic. Responsive to entry of a user query in the form 602, the support services controller 220 and/or mobile application controller 320 may be configured to search a knowledge base and/or perform device diagnostics to provide information and/or a solution responsive to the user query.

As discussed, in some example embodiments, the mobile device support apparatus 102 may be configured to provide a mobile device support portal, such as a web portal, which may be accessed by a mobile device 104 and/or a user terminal 108, such as through a web browser, mobile browser application (e.g., a Wireless Application Protocol browser), and/or the like. In some example embodiments the portal may be viewable on a mobile device 104 through a dedicated client application. The portal may provide notification of outstanding issues, such as outstanding alerts regarding faults that may have been diagnosed on a user's mobile device 104. For example, in some example embodiments, a user may be notified of outstanding issues upon arrival or log-in to the portal. The portal of some example embodiments may provide recommended solutions to identified outstanding issues. In some instances, a solution may comprise instructions that a user may use to manually rectify a fault. Additionally or alternatively, in some instances, a solution may comprise a recommendation that, when selected, may automatically resolve a fault.

In some example embodiments, the portal may provide a user with customized content for a session personalized to the user and his or her mobile device(s). The portal of some example embodiments may enable a user to invoke diagnostics, get a device health check, check the status of previously identified problems, instruct the system to load software automatically, request backups of a mobile device, remotely control a mobile device, and/or perform other support services. For example, the portal may provide a customer service representative with the ability to remotely control a mobile device, such as by providing the customer support representative with the ability to perform one or more of: rebooting the mobile device, powering down the mobile device, installing applications to the mobile device, uninstalling applications from the mobile device, change settings of the mobile device, execute diagnostic routines on the mobile device, backup the mobile device, restore backups to the mobile device, and/or the like. The support services controller 220 may accordingly be configured to communicate with and cause operations to be performed on a mobile device 104 in accordance with user commands received via the portal. Operations performed in accordance with user commands received via the portal may, for example be performed by a client application that may be implemented on the mobile device 104, which may operate under control of the mobile application controller 320. In this regard, a mobile device 104 may be lock stepped with a portal via a client application that may be implemented on the mobile device. Accordingly, an end user may be able to control and interrogate his or her mobile device 104 via the portal. Further, according to an example embodiment, a representation of a current view of the mobile device, such as a reproduction of some portion of a display screen of the mobile device.

The portal may additionally provide a user with the ability to register or otherwise opt-in to receive various support services and/or to adjust configuration settings for support services. For example, a user may choose to receive proactive notifications of various device error/warning/information scenarios that may necessitate user intervention.

Figure 7:
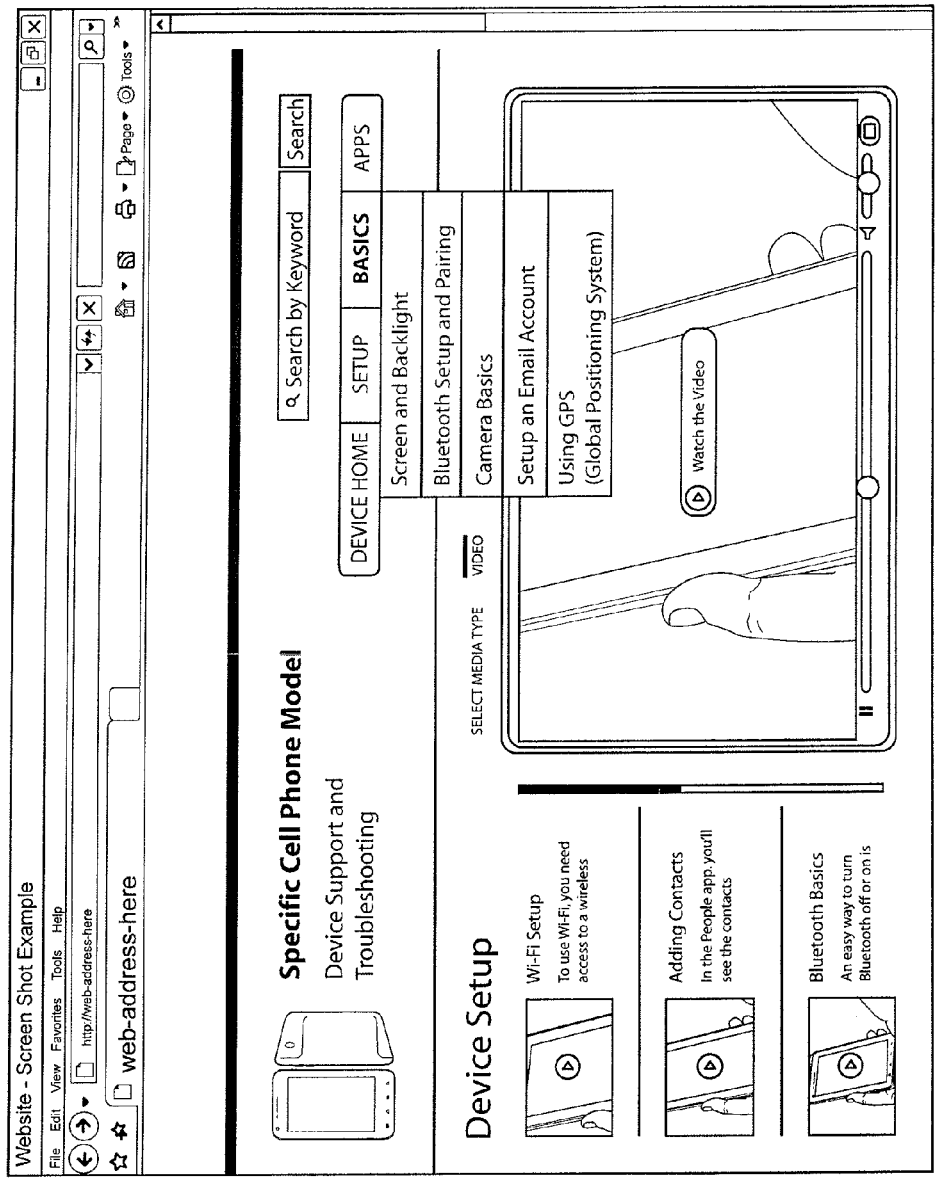

FIGS. 7-10 illustrate example user interfaces for a mobile device support portal provided in accordance with some example embodiments. As illustrated in FIG. 7, the portal may provide the user with device support and troubleshooting information, including device setup information, device operation information, and/or the like, which may be tailored to the user's specific mobile device.

Figure 8:
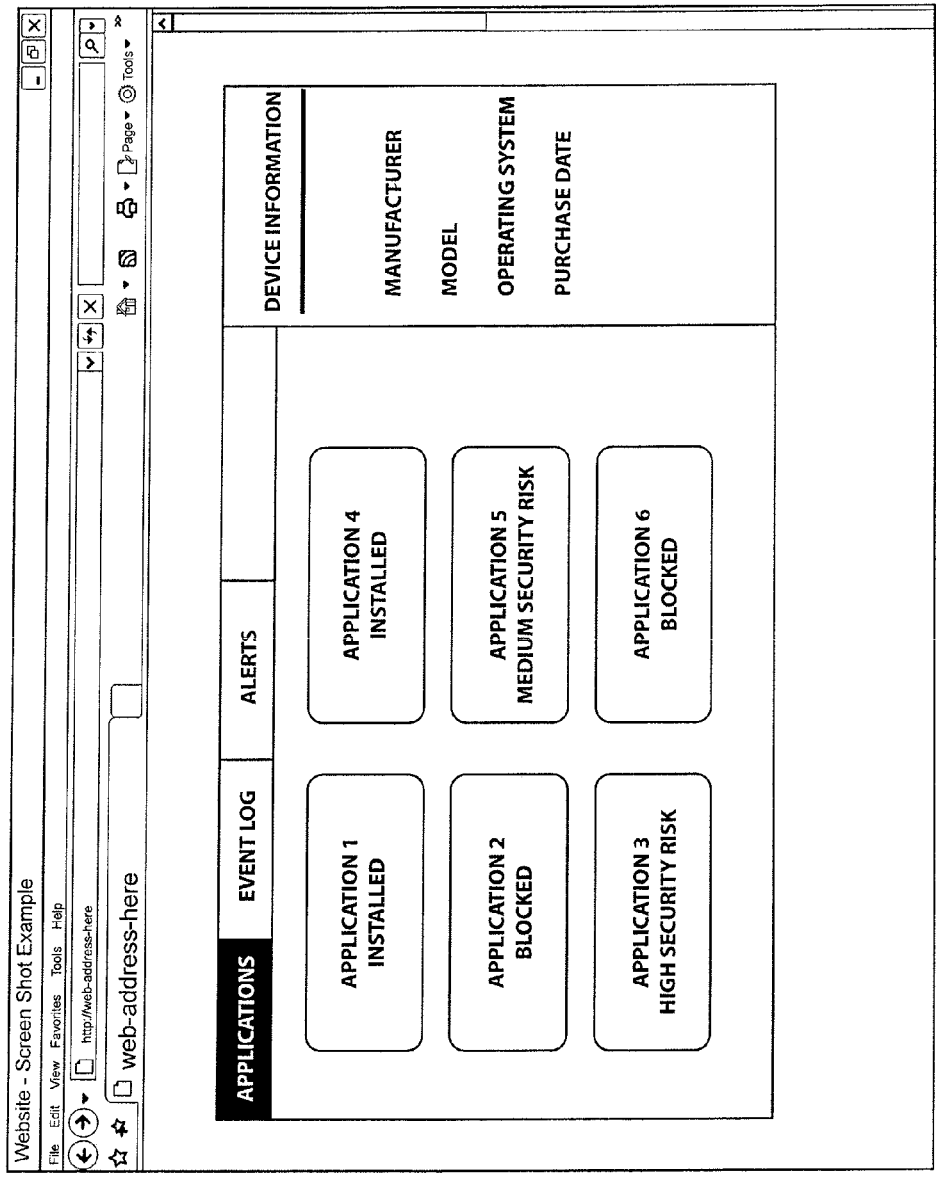

In some example embodiments, the portal may provide an interface for a user and/or authorized customer service representative to review applications installed on his or her device. The interface may include an indication of a threat level (e.g., low security risk, medium security risk, high security risk, or the like) of an installed application. The threat level may, for example, be determined based on known characteristics of the application, resource access permissions granted to the application, whether a developer of the application is trusted, and/or other factors. Additionally or alternatively, the portal may provide an interface for a user to designate particular applications as rejected, blacklisted, or the like to prevent designated applications from being installed on his or her device and/or to have an installed application uninstalled from his or her device. In this regard, FIG. 8 illustrates an interface with a listing of applications along with a status indicator, such as "Installed," "Blocked," "High Security Risk," "Medium Security Risk," or other status indication. For example, a "Blocked" application may comprise an application that may be blocked from a mobile device by a user or other entity. An "installed" application may comprise an application that is installed that does not pose a security risk. An application tabled as a "High/Medium/Low Security Risk" may be an installed application known or determined to present some level of security risk.

In some example embodiments, the portal may include a log of device events, such as may have been collected through monitoring device status over a period of time. This log may be accessible to a user and/or authorized customer service representative. As illustrated in the example of FIG. 9, an event log may set forth information about event types (e.g., setting change, installed application, forced device reboot, and/or the like), along with any available event details and a time/date at which the logged event occurred.

As illustrated in FIG. 10, in some example embodiments the portal may provide an interface accessible to a user and/or an authorized customer service representative indicating device alerts that may have been identified through device diagnostics. The alerts may include an indication of identified blacklisted application, rejected applications, and/or other issues that may cause faults on a mobile device. A user may additionally be able to review solutions to identified faults and elect to have the solutions performed. In some example embodiments, a user may be proactively notified of identified faults and/or other alerts on his or her mobile device while additional detail about the alerts may be accessed via the portal.

In some example embodiments, if a solution to a fault or other problem cannot be identified, the system 100 may provide for escalation to a contact center so that a user may interact with a customer service representative. For example, the support services controller 220 and/or mobile application controller 320 may be configured, in an instance in which it is determined that a solution to an identified fault or other issue may not be automatically determined, to trigger an escalation to the customer service center apparatus. According to another example embodiment, an escalation may be triggered by a user of the mobile device, such as by selecting an escalation option displayed via the support portal. Triggering the escalation may include automatically connecting the user to a customer service representative, scheduling a reservation for a support session with a customer service representative, and/or sending a request to the customer service center apparatus 110 to have a customer service representative contact the user.

In accordance with various example embodiments, any of a variety of communication technologies may be used to facilitate communication between a mobile device user and a customer service representative for an escalated support session. By way of example, a VoIP session, public switched telephone network (PSTN) voice session, web chat session, text chat session, email communication, video call, and/or other communication technology may be used to facilitate communication between a mobile device user and a customer service representative.

Some embodiments employ a reservation protocol to ensure that a user does not have to wait for a customer service representative and to ensure that a reserved customer service representative is not applied to another task. For example, in some example embodiments in which a reservation for a customer service representative is scheduled, the user's mobile device 104 may be configured to initiate a session (chat, voice, etc) with the customer service center responsive to the reservation. The contact may be intelligently routed to the reserved customer service representative. As another example, a user may elect a contact means through which the customer service representative to contact the user in accordance with a reservation. In this regard, the reservation may specify a contact time and/or a contact method, such as a designated phone number or contact methodology (e.g., chat, voice, email, etc).

In some embodiments in which a session is intelligently routed to a reserved customer service representative, the phone call or other communication that may be originated by the mobile device 104, such as under control of a mobile application that may be implemented on the mobile device, may be automatically routed directly to the reserved customer service representative. In this regard, known information about the user's identity, unresolved issue, device profile information, and/or the like may be leveraged without requiring the user to participate in a screening process, such as an Interactive Voice Response (IVR) screening process, that might otherwise be used to determine the user's identity, details about the unresolved issue, and/or the like before routing a user to a live customer service representative. For example, computer telephony may be used to inform the customer service center apparatus 110 of details to facilitate servicing the user's issue without necessitating a screening process. In some example embodiments, a call initiated from the mobile device 104 to the customer service representative may be directly connected without the user even experiencing a "ringing" period before connecting.

In some example embodiments, the mobile device support apparatus 102 and/or customer service center apparatus 110 may be configured to select a customer service representative suited to resolve the issue. In this regard, a variety of information regarding a plurality of customer service representatives may be tracked and used to determine a suitable customer service representative to assign to a support session. For instance, example embodiments may seek to assign customer service representatives having experience in solving the problem at issue, or at least problems of a similar nature. In this regard, example embodiments may store one or more experience ratings respectively associated with particular customer service representatives. These experience ratings may, for example, correspond to various problems with mobile devices or to particular device configurations as indicated by the device status data, such as by representing an amount of experience that a given customer service representative has in solving the various problems or in solving problems arising from the particular device configurations. Thus, according to an example embodiment, the assignment of a customer service representative to a support session may comprise comparing one or more predicted faults to one or more experience indications corresponding to the predicted faults and respectively associated with a plurality of customer service representatives. According to other example embodiments, any number of other characteristics of customer service representatives may be tracked and used to determine which customer service representative to assign to a support session. For example, information such as languages spoken by the customer service representative, fault resolution times, fault resolution success rates, customer feedback, etc., may be tracked and used at least in part to make the determination of which customer service representative to assign to a given support session.

In some example embodiments, the support service controller 220 and/or mobile application controller 320 may be configured to assess factors beyond determining that a solution to an identified fault or other issue may not be automatically determined in assessing whether to escalate the issue to a customer service representative. For example, issues such as the cost of escalation opposed to the cost to simply instruct the user to return his or her device for replacement, the nature of the issue, the likelihood that the customer service representative can resolve the issue, and/or other factors may be considered. According to an example embodiment, assessing whether to escalate an issue to a customer service representative may alternatively or additionally be based at least in part on probability information. For example, the assessment may be based at least in part on a probability that a fault will be successfully resolved in response to implementing one or more solutions, such probability information being determined based at least in part on received information regarding solution implementation results, as discussed above.

In some example embodiments, the customer service representative may have access to captured device status data, session data relating to automated attempts to resolve the fault at issue, device diagnostic data, and/or other data that may be captured in accordance with various example embodiments. For example, this data may be provided to the customer service center apparatus 110 by the mobile device support apparatus 102 and/or may be otherwise accessible to the customer service center apparatus 110. Accordingly, the customer service representative may use the data to aid the support session. In this regard, the data may be used so that a user is not burdened with having to explain a problem and to avoid duplicating previously attempted solutions that were unsuccessful.

Some example embodiments may utilize captured device status information, to evaluate the health of a mobile device 104 (including the device's history) for the purpose of determining a current value of the mobile device. For example, one or more potential faults related to the mobile device may be determined based at least in part on mobile device status data received from the mobile device. According to an example embodiment, a current value may then be determined based at least in part on these potential faults. According to a further example embodiment, the current value may be determined further based at least in part on probability information. For example, the determination may be based at least in part on a probability that at least one potential fault will be successfully resolved in response to implementing one or more solutions, such probability information being determined based at least in part on received information regarding solution implementation results, as discussed above. In this way, the current value of a device may, for example, not be lowered by faults which are relatively likely to be corrected through the application of routine solutions. On the other hand, faults which are unlikely to be resolved may have a negative effect on device value. This evaluation may, for example, be performed by and/or with the assistance of one or more of the support services controller 220 or mobile application controller 320.

According to an example embodiment, the current value may then be used, for instance, to determine an offer to buy back the mobile device (e.g., asset recovery), or to determine an offer to trade-in or upgrade the mobile device. For example, the current value may be used in a determination of whether to generate an offer to buy the mobile device. According to a further example embodiment, both the current value and the probability information discussed above, e.g., the probability of resolving at least one potential fault, may be used to determine whether to generate offer to buy the mobile device. For example, a buyback score may be determined based at least in part on the current value and the probability information discussed above, and this buyback score may then be compared to a threshold, such that an offer to buy the mobile device is only generated if the threshold is satisfied. According to other example embodiments, the current value may comprise a current insurable value. According to a further example embodiment, whether the mobile device is eligible for inclusion in a particular insurance policy may be determined based at least in part on information regarding potential faults and/or the current value. Given the known health of the device, e.g., given information regarding one or more potential faults, it is thus possible for an entity, such as a device manufacturer, wireless service provider, insurance provider, warranty provider, or other entity, to make an "on the spot" offer to the user. Accordingly, the offer may be based on a priori knowledge of device health rather than having to make a contingent offer with payment being contingent upon the mobile device satisfying a post-return inspection. According to other embodiments, the risk of such a contingent offer may, for example, be reduced by considering the probability information discussed above. Thus, embodiments such as those described above may allow mobile service providers to make more educated determinations of whether to buy back devices and, if so, for how much money.

Further, offers that might generally be tied to a restricted actuarial time window in which it may be presumed that a device has a health status of a defined level, may be extended beyond the defined actuarial time window such that an offer may be available outside of the window based on knowledge of mobile device health. Thus, for example, if a device is known to be healthy 180 days following purchase, a customer may be able to purchase device insurance even if there is normally a restriction that the insurance offer must be accepted within 90 days of device purchase.

In some example embodiments, the support services controller 220 and/or mobile application controller 320 may be configured to use captured device status information to evaluate wireless voice and/or data usage. The support services controller 220 and/or mobile application controller 320 may be further configured to determine and make recommendations about wireless data plans available from various, compatible carriers based upon the evaluation of wireless voice and/or data usage. For example, if the system determines that a user has exhibited habitually high data usage with very low voice usage (e.g. the case where a VoIP dialer is preferred over carrier minutes), then the system may suggest a move to another carrier that offers preferential rates for lower voice minutes and higher data rates/allowances. In some such example embodiments, a portal that may be provided by the mobile device support apparatus may aggregate deals for a variety of voice and data plans from one or more carriers, and may provide a recommended plan(s) on the basis of evaluation of historical voice and/or data usage.

Referring now to FIG. 11, FIG. 11 illustrates a flowchart according to an example method for providing mobile device support services according to some example embodiments. In this regard, FIG. 11 illustrates operations that may be performed at and/or by a mobile device support apparatus 102 and/or a mobile device 104. The operations illustrated in and described with respect to FIG. 11 may, for example, be performed by, with the assistance of, and/or under the control of one or more of the processing circuitry 210, processor 212, memory 214, communication interface 218, support services controller 220, processing circuitry 310, processor 312, memory 314, user interface 316, communication interface 318, or mobile application controller 320. Operation 1100 may comprise receiving registration for mobile device support services. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1100. Operation 1110 may comprise determining registration information. The registration information may be provided as part of the registration and/or may be determined or otherwise inferred from the registration. In this regard, the registration information may comprise configuration settings for mobile device support services, information regarding a type of mobile device for which support services are to be provided and/or the like. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1110. Operation 1120 may comprise providing mobile device support services in accordance with the determined registration information. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1120.

FIG. 12 illustrates a flowchart according to an example method for performing device diagnostics according to some example embodiments. In this regard, FIG. 12 illustrates operations that may be performed at and/or by a mobile device support apparatus 102 and/or a mobile device 104. The operations illustrated in and described with respect to FIG. 12 may, for example, be performed by, with the assistance of, and/or under the control of one or more of the processing circuitry 210, processor 212, memory 214, communication interface 218, support services controller 220, processing circuitry 310, processor 312, memory 314, user interface 316, communication interface 318, or mobile application controller 320. Operation 1200 may comprise monitoring a mobile device status. The processing circuitry 210, processor 212, memory 214, communication interface 218, support services controller 220, processing circuitry 310, processor 312, memory 314, communication interface 318, and/or mobile application controller 320 may, for example, provide means for performing operation 1200. Operation 1210 may comprise performing device diagnostics based at least in part on captured device status data to identify potential faults that may affect mobile device functionality. The processing circuitry 210, processor 212, memory 214, communication interface 218, support services controller 220, processing circuitry 310, processor 312, memory 314, communication interface 318, and/or mobile application controller 320 may, for example, provide means for performing operation 1210.

In an instance in which a fault is identified in operation 1210, the method of FIG. 12 may optionally further include operation 1220 1225, 1230, and/or 1235. Operation 1220 may comprise providing an indication of an identified fault. The indication may, for example, be provided via a user interface of the user's mobile device and/or may be provided via a mobile device support portal. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1220.

Operation 1225 may comprise receiving information regarding solution implementation results. As discussed above, the solution implementation results may, for example, comprise information regarding whether one or more solutions were successful in resolving a given fault. Operation 1230 may comprise determining a solution for the identified fault. In some instances, the determined solution may be automatically performed. Alternatively, the determined solution may be provided for review and approval by a user before being performed. Operation 1235 may comprise determining a probability that implementing the solution will resolve one or more of the identified faults. According to some example embodiments, determining a solution (operation 1230) may involve using the probability information, such as by determining a solution with the highest probability of resolving a given fault. According to another example embodiment, the probability information may be provided to the user, such as in conjunction to providing the determined solution to the user for review and approval. This probability information may, for example, be updated as additional solution implementation results are received. As still a further alternative, if the solution requires user action, such as in an instance in which the determined solution is to return the mobile device for return or replacement, instructions for effecting the solution may be provided to the user. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operations 1225, 1230, and 1235.

FIG. 14 illustrates a flowchart according to an example method for providing a support session, such as between a customer service representative and a mobile device according to some example embodiments. In this regard, FIG. 14 illustrates operations that may be performed at and/or by a customer service center apparatus 110, a mobile device support apparatus 102, and/or a mobile device 104.

The operations illustrated in and described with respect to FIG. 14 may, for example, be performed by, with the assistance of, and/or under the control of one or more of the processing circuitry 210, processor 212, memory 214, communication interface 218, support services controller 220, processing circuitry 310, processor 312, memory 314, user interface 316, communication interface 318, or mobile application controller 320.

Operation 1400 may comprise receiving device status data from a mobile device. The status data may, for example, include any of the types of status data discussed above. According to an example embodiment, the status data may additionally or alternatively include information regarding actions taken by a user of the mobile device prior to a support session as discussed below. For example, the information regarding actions taken by the user may include information regarding support information accessed by the user. Support information may include, for example, setup information or information regarding one or more potential faults, such as may be provided for example via an interface depicted in any of FIGS. 5-10. According to another example embodiment, the information regarding actions taken by the user may include information regarding corrective actions performed by the user. Such information regarding corrective actions performed by the user may include, for example, information regarding self-help tools the user has used; information regarding actions performed by the user in accordance with accessed support information, such as instructions, guides, troubleshooting steps, walkthroughs, videos, and/or the like; and/or any other corrective actions performed by the user, such as any actions performed in an attempt to resolve a fault. These steps or actions may include, for example, rebooting the mobile device, installing or uninstalling applications, replacing a battery, changing settings, and/or the like. The processing circuitry 210, processor 212, memory 214, communication interface 218, support services controller 220, processing circuitry 310, processor 312, memory 314, communication interface 318, and/or mobile application controller 320 may, for example, provide means for performing operation 1400.

Operation 1410 may comprise determining one or more predicted faults related to the mobile device based at least in part on the received status data. The processing circuitry 210, processor 212, memory 214, communication interface 218, support services controller 220, processing circuitry 310, processor 312, memory 314, communication interface 318, and/or mobile application controller 320 may, for example, provide means for performing operation 1430.

Operation 1420 may comprise determining a level of sophistication, e.g., technical knowledge, skill, interest, patience, or aptitude of the user of the mobile device based at least in part on the mobile device status data. For example, the user's level of sophistication (also referred to herein as a "user sophistication level") may be determined based at least in part on mobile device status data such as application profiles, crash histories, support content accessed by the user of the mobile device, the user of the mobile device's ratings of support content they have accessed, an indication of how frequently the user of the mobile device has accessed support content or engaged in a support session, and/or any other device status data which may directly or indirectly relate to a level of sophistication of the user of a mobile device.

Operation 1430 may comprise causing support information to be provided to the mobile device. As discussed above, the support information may, for example, comprise information regarding one or more potential faults, e.g., predicted or present faults, determined in operation 1410. The support information may additionally or alternatively include information regarding one or more solutions for the one or more potential faults, the determination such solutions being discussed previously. For example, the support information may comprise instructions, guides, troubleshooting steps, walkthroughs, videos, and/or the like, as discussed above. According to an example embodiment, the support information may include probability information, such as one or more probabilities that implementing one or more solutions will cure a potential fault, as discussed above. According to an even further example embodiment, the support information that is provided for access to the mobile device user may be determined based at least in part on the user's determined level of sophistication. For example, more complex or esoteric support information may be provided to more sophisticated users, while simpler or more readily-understood or followed support content may be provided to less sophisticated users.

Operation 1440 may comprise determining whether to escalate to a support session facilitated by a customer service representative. According to an example embodiment, this determination may comprise determining whether an escalation request regarding the mobile device was received. The escalation request may, for example, be received from the mobile device or via a web portal, such request, for example, being generated in response to a user of the mobile device selecting an escalation option (e.g., as may be presented in a drop down menu of a graphical user interface, etc.) presented via the mobile device or web portal. Thus, for example, a user who has been unsuccessful in resolving one or more issues with their device, such as by referring to the support information that may be provided in operation 1430, may select an escalation option and thereby trigger generation of an escalation request.

According to another example embodiment, the determination of whether to escalate may be made such as by the mobile device support apparatus 102, based upon a determination that a solution cannot be automatically implemented or a fault may be too complex or difficult for the user to resolve on their own. According to yet another example embodiment, the determination of whether to escalate may be based on the received device status data or the one or more determined potential faults. Thus, for example, if particularly complex or serious faults are determined or particularly troubling device status data is received, a determination to escalate may be automatically made. According to a still further example embodiment, the determination of whether to escalate may be made based at least in part on the user's level of sophistication or technical knowledge as determined in operation 1420. For example, less sophisticated mobile device users may either be automatically escalated more quickly, e.g., immediately, or may have an option to escalate presented to them more quickly (e.g., the mobile device support apparatus may cause an "escalate now" button to appear on the graphical user interface of the mobile device or support portal, which is then clickable by the user to initiate escalation), while more sophisticated mobile device users may not be presented with an option to escalate or may never be automatically escalated. Thus, pursuant to operations 1430 and 1440, a less sophisticated user may be provided with less complex support information and may be more readily escalated to a customer service representative, while a more sophisticated user may, for example, be provided with more sophisticated or esoteric support content instead of being either automatically escalated or presented with the option to escalate.

The processing circuitry 210, processor 212, memory 214, communication interface 218, support services controller 220, processing circuitry 310, processor 312, memory 314, communication interface 318, and/or mobile application controller 320 may, for example, provide means for performing operation 1410.

Operation 1450 may comprise initiating a support session with the mobile device. The support session may, for example, be initiated in response to determining to escalate, such as in response to receiving an escalation request. According to another example embodiment, receiving the escalation request or otherwise determining that an escalation should take place may cause the mobile device to be inserted in a support session queue, such that a support session is not initiated with the mobile device until it is the mobile device's turn. The processing circuitry 210, processor 212, memory 214, communication interface 218, support services controller 220, processing circuitry 310, processor 312, memory 314, communication interface 318, and/or mobile application controller 320 may, for example, provide means for performing operation 1420.

Operation 1460 may comprise assigning a customer service representative to the support session. Assigning the customer service representative to the support session may comprise determining a suitable customer service representative to handle the support session. The determination of a suitable customer service representative may be based at least in part on information regarding a plurality of customer service representatives. For example, and as discussed above, a customer service representative's experience level with resolving the one or more predicted faults or supporting a particular device configuration, as may be determined based on the received status data, may be taken into account. Other information, such as languages spoken, fault resolution times, fault resolution success rates, or customer feedback may also or alternatively be taken into account when determining a suitable customer service representative. According to other example embodiments, the information regarding the plurality of customer service representatives may be as simple as group assignments, schedules, availability, and/or the like.

The determination of a suitable customer service representative may, according to another example embodiment, be additionally or alternatively be based at least in part on any of the mobile device status data discussed above. As one example, actions performed by a user of the mobile device prior to the support session being initiated may be taken into account, such as support information accessed by the user, and/or corrective actions performed by the user. According to a further example embodiment, one or more user ratings, such as user satisfactions ratings, of the support information accessed by the user may also be received as part of the device status data and used in the determination. In this way, a user's relative satisfaction or frustration with their self-help experience prior to the call may be evaluated and taken into consideration when determining a customer service representative. According to an even further example embodiment, the user's level of sophistication or technical knowledge may be used, for example, in the determination of a customer service representative, such as by correlating the user sophistication level with the information regarding the plurality of customer service representatives. For example, certain customer service representatives may be more adept, as indicated by various metrics and/or statistics collected regarding the certain customer service representatives, at handling support sessions with less sophisticated users and, accordingly, such customer service representatives may receive preference when assignments are being made to support sessions involving such users. The processing circuitry 210, processor 212, memory 214, communication interface 218, support services controller 220, processing circuitry 310, processor 312, memory 314, communication interface 318, and/or mobile application controller 320 may, for example, provide means for performing operation 1460.

Operation 1470 may comprise providing the previously received status data to the assigned customer service representative. Thus, the assigned customer service representative may have access to any data collected from the device, which may eliminate or reduce the need to gather additional information from the user of the mobile device. As discussed above, this status data may, for example, include information regarding actions taken by a user of the mobile device prior to the initiation of the support session, such as information regarding support information accessed by the user or information regarding corrective actions performed by the user. The processing circuitry 210, processor 212, memory 214, communication interface 218, support services controller 220, processing circuitry 310, processor 312, memory 314, communication interface 318, and/or mobile application controller 320 may, for example, provide means for performing operation 1470.

Operation 1480 may comprise providing an indication of the level of sophistication of the user, as may be determined in operation 1420, to the customer service representative. In this way, a customer service representative may have an expectation of how to most effectively communicate with the user and what actions may, for example, need to be performed on the user's device via remote control. The processing circuitry 210, processor 212, memory 214, communication interface 218, support services controller 220, processing circuitry 310, processor 312, memory 314, communication interface 318, and/or mobile application controller 320 may, for example, provide means for performing operation 1480.

Operation 1490 may comprise providing for remote control of the mobile device. In this regard, this operation may involve allowing the customer service representative to control various operations on the mobile device remotely. For example, the customer service representative may be provided with the ability to perform one or more of rebooting the mobile device, powering down the mobile device, installing applications to the mobile device, uninstalling applications from the mobile device, changing settings of the mobile device, initiating backup the mobile device (e.g., storing files, data, applications, settings, configurations, etc., to a remote memory or server), or restoring backups (e.g., previously stored files, data, applications, configurations, etc.) to the mobile device. The processing circuitry 210, processor 212, memory 214, communication interface 218, support services controller 220, processing circuitry 310, processor 312, memory 314, communication interface 318, and/or mobile application controller 320 may, for example, provide means for performing operation 1490.

Backup and Restore Services

Some example embodiments also provide backup and restore services for mobile devices. In particular, the support services controller 220 may be configured to maintain a backup record of applications and/or other data installed on a mobile device 104. This record may, for example, be determined on the basis of application profiles that may be captured on the basis of monitoring a status of the mobile device 104 in accordance with one or more previously described embodiments.

In some example embodiments, backup may be an ongoing process, which may backup applications and/or other data installed on a mobile device 104 an ongoing basis. In this regard, monitoring may be performed in some example embodiments constantly (e.g., as a background process), periodically, aperiodically, and/or the like in order to capture information about applications and/or other data installed on the device, updates or changes since a previous monitoring cycle, and/or other information that may be captured to facilitate the backup and restore services provided by some example embodiments. Additionally or alternatively, in some example embodiments, monitoring and backup may be performed on demand.

Device status information that may be captured through monitoring in accordance with some example embodiments may be used to provide for interception of activity, updates, device changes, storage of new data on a device, and/or the like as a background process that may be substantially transparent to a user. Changes may be noted and may be utilized for the purpose of obtaining a restorative backup record for a mobile device. A user may opt in for the backup service, such as through a registration process. Registration and configuration of the backup process may, for example, be carried out via a mobile device services portal that may be provided by the mobile device support apparatus 102. Additionally or alternatively, backup may be an on-demand process, such as may be initiated in response to a user request, such as prior to a user discarding an old device for a new or replacement device.

In some example embodiments, a user may be able to configure the types of data that may be backed up. For example, a user may select whether to backup applications, application configuration settings, device configuration settings, contacts, photos, videos, documents, and/or other types of data that may be installed on or otherwise stored on a mobile device.

In an instance in which a user wishes to restore a backup record to a mobile device, the user may request that a backup record that may be maintained by the mobile device support apparatus 102 be restored to a designated mobile device 104. The request may, for example, be made via a mobile application that may operate under control of the mobile application controller 320. As another example, a user may use a mobile device, user terminal 108, or other computing device to access a mobile device support portal that may be provided by the mobile device support apparatus 102 and submit a request to restore the backup record via the portal. In response to the request, the support services controller 220 and/or mobile application controller 320 may be configured to restore the backup record to a mobile device 104.

In some example embodiments, an application or service portal dialog may walk the user through an automated self-reinstallation/restoration process. In this regard, in some example embodiments, a user may be walked through an automated self-reinstallation/restoration of a mobile device, which may include, for example, restoration of applications (with settings, preferences, changes made over time to the users basic/original downloaded applications), sensitive information such as user identification names and passwords, and/or other data. In some example embodiments a user may be connected to a customer service representative, help desk, or the like, such as via the customer service center apparatus 110 such that the user may be provided with assistance for engaging in a restoration process.

Restoration of a backup record may be used for a variety of purposes in accordance with various example embodiments. As an example, a backup record may be used to facilitate restoration of a mobile device to a last known working condition. Thus, for example, when a user's mobile device is inoperable due to a fault, such as may be determined in accordance with an embodiment disclosed herein, the user may use the backup record to restore a mobile device to a previous condition, excluding destructive or malicious applications, data, or programs. Additionally or alternatively, a backup record may be used to restore a replica of a device state of a lost, stolen, or inoperable mobile device to a new or replacement mobile device. Accordingly, when a user is deemed eligible for an upgrade, a backup record may be used to replicate an old device state on the new device.

In some example embodiments, backup and restore services may go beyond reinstallation of previously installed application. For example, some example embodiments provide for restoration of customizations, add-ons, and/or other modifications made to applications by the user after original application downloads and/or application configuration settings made by the user, device configuration settings made by the user and/or the like in addition to installing/re-installing the applications.

Further still, in some example embodiments, actions taken by applications may be monitored such that modifications made attendant to those actions may be backed up. For example, an application may save files and/or other data in a location that is local to the application space. Some example embodiments may monitor for an application saving data and may accordingly back up the stored data, along with its storage location. Accordingly data that may be stored in a location unique to a particular application may be backed up without requiring advance notice of an underlying file structure.

For example, a user may download and install an application enabling a user to animate a still image. The user may import a photo and use the application to animate the photo and add a voice over to the animated photo to make the photo look as if it is animated and speaking. The animated photo may be stored by the application in a location local to the application. The backup and restore services provided by some example embodiments may backup and restore the animated photo in addition to the application, rather than just restoring the application.

As a further example, a user may download and install a game application. The game may track the user's high scores, which may be stored in a space local to the application. Some example embodiments may provide for backup and restoration of the user's high scores along with the application itself.

As another example, a user may download and install a magazine application enabling a user to read magazines on his or her mobile device. Some example embodiments provide for backup and restoration of the user's magazine subscriptions, bookmarks, and other settings in addition to the magazine application itself.

Some example embodiments further provide for backup and restoration of a mobile wallet. Backup and restoration of a mobile wallet may include backup and restoration of a mobile wallet application, mobile wallet contents, secure element provisioning, credentialing, related contact information, and/or the like, thereby allowing a restored mobile wallet to become authenticated/credentialed, provisioned, and usable. Some such example embodiments enable restoration of a near-field communication (NFC) enabled mobile wallet. As such, backup and restoration services of such example embodiments may eliminate an otherwise labor intensive process by quickly restoring the mobile wallet and saving the user from the effort of again performing labor intensive credentialing and authentication processes. In some example embodiments providing mobile wallet reinstallation/restoration, credentialing and re-provisioning of the mobile wallet may be an automated step whereby it is done automatically on the user's behalf with little or no involvement behind the scenes. As another example, mobile wallet restoration may be a user-facilitated process whereby a user may be provided with step-by-step instructions, a phone number or other contact means through which a user may contact a customer service representative for assistance, and/or the like.

Some example embodiments providing for backup and restoration of a mobile wallet eliminate the need for the user to remember the steps required for fully reinstalling the mobile wallet and the individual companies that would otherwise need to be contacted to make the mobile wallet fully functional for desired transactions. In this regard, depending on the mobile wallet provider, a mobile carrier, mobile wallet provider, financial institution, a trusted service manager providing the secure element (e.g., an NFC secure element), and/or other parties may have to be contacted to fully enable mobile wallet functionality. Some example embodiments reduce the burden on users by contacting the appropriate entities to facilitate re-provisioning the device's secure element to restore the mobile wallet. In this regard, for example, some example embodiments track entities that need to be contacted in order to restore a mobile wallet and contact the appropriate entities automatically, semi-automatically, and/or under the direction of the user.

Referring now to FIG. 13, FIG. 13 illustrates a flowchart according to an example method for providing backup and restore services according to some example embodiments. In this regard, FIG. 13 illustrates operations that may be performed at and/or by a mobile device support apparatus 102 and/or a mobile device 104. The operations illustrated in and described with respect to FIG. 13 may, for example, be performed by, with the assistance of, and/or under the control of one or more of the processing circuitry 210, processor 212, memory 214, communication interface 218, support services controller 220, processing circuitry 310, processor 312, memory 314, user interface 316, communication interface 318, or mobile application controller 320. Operation 1300 may comprise maintaining a backup record of applications and/or other data installed on a mobile device. In some example embodiments, operation 1300 may comprise maintaining the backup record through performance of a monitoring process that may monitor for device changes. The monitoring process may be performed constantly, periodically, aperiodically, on demand, and/or the like. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1300. Operation 1310 may comprise receiving a request to restore the backup record to a mobile device. The request may be to restore the backup record to the mobile device form which the backup record was obtained, or may be to restore the backup record to another mobile device, such as a new or replacement device. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1310. Operation 1320 may comprise restoring the backup record responsive to the request. In some example embodiments, operation 1320 may be fully automated. Additionally or alternatively, in some example embodiments, operation 1320 may comprise providing a user with a guided restore process. The processing circuitry 210, processor 212, memory 214, communication interface 218, support services controller 220, processing circuitry 310, processor 312, memory 314, user interface 316, communication interface 318, and/or mobile application controller 320 may, for example, provide means for performing operation 1320.

Data Destruction Services

Some example embodiments additionally provide a destruction process that may be triggered to lock and/or wipe memory of a mobile device, such as a lost or stolen mobile device, a mobile device to be exchanged for an upgrade, a mobile device to be sold, and/or the like. Destruction of data may, for example, be performed by and/or under the control of the support services controller 220 and/or mobile application controller 320.

In some example embodiments, the mobile device support apparatus 102 may provide a mobile device support portal that may enable a user to trigger remote destruction of data on his or her mobile device. For example, a user may access the portal, such as via a user terminal 108, or even directly via a mobile device 104 for which data is to be wiped. In some embodiments, the mobile device 104 may be synced with the portal such that the mobile device support apparatus 102 may wipe clean or otherwise destroy information stored on the device. Additionally or alternatively, the mobile device support apparatus 102 may transmit a signal transmission over the network 106 that may trigger the mobile device to execute a destruction process to destroy data stored on the mobile device.

Additionally or alternatively, in some example embodiments, a destruction process may be triggered directly via a mobile device 104, such as via the user interface 316. In this regard, a user may trigger a destruction process that may execute directly on the mobile device.

Some example embodiments facilitate data destruction for a lost or stolen device even if the device is not reachable over the network 106 by the mobile device support apparatus 102. For example, if a mobile device 104 is not active or not receiving a signal when a user attempts to remotely destroy data stored on the device, the user may select to have the data wiped when the device is next booted provided that a specified passcode is not provided. As such, a destruction process may be executed in response to a predefined number of failures of a user (e.g., a potentially malicious user that has found or stolen the device) to enter a correct passcode during the next device boot.

In some example embodiments, the mobile application controller 320 may be configured to autonomously destroy data stored on the device in response to predefined criteria indicating that the device has been lost or stolen. For example, if a passcode is required to unlock or boot a mobile device and an incorrect passcode is entered a predefined number of times, the mobile application controller 320 may destroy data stored on the device even in the absence of receiving a command from the mobile device support apparatus 102 or other device over the network 106. As another example, the mobile application controller 320 may be configured to execute a destruction process after a predefined period of inactivity (e.g., a predefined number of days of inactivity).

The destruction process of some example embodiments may wipe clean and destroy personal information (e.g., photos, text messages, pictures, music, contacts, financial account information, and/or the like) that may be stored on the device. Data may be wiped from any and all memory partitions of the mobile device, whether hidden or open to third parties that may handle the device either while it is in transit for return, refurbishment, sold or in the hands of an unwanted person. The destruction process of some example embodiments may render memory chips, secure digital (SD) cards, and/or other storage mechanisms useless and unrecoverable. In this regard, rather than purging memory in a manner so that data may still be extracted based on data remnants left in the memory, some example embodiments render a memory, chip, SD card, and/or the like fully inaccessible and/or unreadable. For example, some example embodiments "shock" or "burn" a memory to render it impossible for anyone to extract any data remnants. Accordingly, a user may avoid leaving a trail of private data behind that could later be accessed by an unauthorized person.

Device Valuation

FIG. 15 illustrates a flowchart according to an example method for providing for device valuation and buyback or insurance offer generation. In this regard, FIG. 15 illustrates operations that may be performed at and/or by a customer service center apparatus 110, a mobile device support apparatus 102, and/or a mobile device 104.

The operations illustrated in and described with respect to FIG. 14 may, for example, be performed by, with the assistance of, and/or under the control of one or more of the processing circuitry 210, processor 212, memory 214, communication interface 218, support services controller 220, processing circuitry 310, processor 312, memory 314, user interface 316, communication interface 318, or mobile application controller 320.

Operation 1500 may comprise receiving device status data from a mobile device. The status data may, for example, include any of the types of status data discussed above. According to an example embodiment, the status data may additionally or alternatively include solution implementation results information, as discussed above. Operation 1510 may comprise determining, based at least in part on the received status data, one or more potential, e.g., predicted or present, faults related to the mobile device. The one or more faults may be determined in accordance with any of the processes, operations, or the like discussed above. Operation 1520 may comprise determining, based at least on the one or more potential faults, one or more potential solutions to the one or more potential faults, as discussed above. Operation 1530 may comprise determining, based at least in part on the solution implementation results information, a probability of resolving at least one of the faults. Such probability information may be determined, for instance, in accordance with any of the processes, operations, or the like discussed above. The processing circuitry 210, processor 212, memory 214, communication interface 218, support services controller 220, processing circuitry 310, processor 312, memory 314, communication interface 318, and/or mobile application controller 320 may, for example, provide means for performing operations 1500, 1510, 1520, and 1530.

Operation 1540 may comprise determining a current value of the mobile device. According to an example embodiment, the determination may be based at least in part on the potential faults determined in operation 1510. According to example embodiments, the value may be further based at least in part on the received mobile device status data, such as information regarding a make and/or model of the mobile device, an age of the mobile device, and/or other mobile device status data that may be useful in determining a value of the mobile device. According to a further example embodiment, the current value may be determined further based at least in part on probability information. For example, the determination may be based at least in part on a probability that at least one potential fault will be successfully resolved in response to implementing one or more solutions, such probability information being determined based at least in part on received information regarding solution implementation results, as discussed above. In this way, the current value of a device may, for example, not be lowered (at least significantly) by faults which are relatively likely to be corrected through the application of routine solutions. On the other hand, faults which are unlikely to be resolved may have a negative effect on device value. According to an example embodiment, the value determined in operation 1540 may comprise an insurable value. According to further example embodiments, operation 1540 may comprise two steps instead of one. For example, a first step of determining whether the mobile device is eligible for valuation may precede determining a value of the mobile device. Eligibility may be determined, for example, based on the received device status data, the one or more determined faults, the one or more determined solutions, and/or the probability information, such as a probability of a fault being cured via implementation of a solution, discussed above. As a specific example, a device with especially serious faults, such as a severely damaged display, a device that has been seriously compromised, such as through "rooting" or the like, or a device with water damage, may be determined not to be eligible for valuation. In an instance in which it is determined that a device is ineligible for valuation, the valuation step may not take place, while in an instance in which the device is determined to beeligible, the valuation step may take place. The processing circuitry 210, processor 212, memory 214, communication interface 218, support services controller 220, processing circuitry 310, processor 312, memory 314, communication interface 318, and/or mobile application controller 320 may, for example, provide means for performing operation 1540.

Operation 1545 and 1550 may comprise, respectively, determining whether to generate an insurance offer, e.g., an insurance quote for the mobile device, and whether to generate a buyback offer, e.g., an offer to buy the mobile device. With respect to operation 1550, the current value may be used in a determination of whether to generate an offer to buy the mobile device. According to a further example embodiment, both the current value and the probability information discussed above, e.g., the probability of resolving at least one potential fault, may be used to determine whether to generate an offer to buy the mobile device. For example, a buyback score may be determined based at least in part on the current value and the probability information discussed above, and this buyback score may then be compared to a threshold, such that an offer to buy the mobile device is only generated if the threshold is satisfied.

With respect to operation 1545, whether the mobile device is eligible for inclusion in one or more insurance policies may be determined based at least in part on information regarding the potential faults and/or the current value. Thus, if it is determined that the mobile device is indeed eligible (e.g., satisfies sufficient policy terms based on the device status data or information derived from the device status data) for one or more insurance policies, an offer, e.g., an insurance quote may be generated and presented to the user for the protection of the device against a covered loss.

According to a further example embodiment, both the current value and the probability information discussed above, e.g., the probability of resolving at least one potential fault, may be used to determine whether to generate an insurance quote for insuring the mobile device against a covered loss. For example, an insurability score may be determined based at least in part on the current value and the probability information discussed above, and this insurability score may then be compared to a threshold, such that a quote is only generated if the threshold is satisfied. The processing circuitry 210, processor 212, memory 214, communication interface 218, support services controller 220, processing circuitry 310, processor 312, memory 314, communication interface 318, and/or mobile application controller 320 may, for example, provide means for performing operations 1545 and 1550.

Operation 1560 may comprise generating an offer. As discussed above, the offer may comprise an offer to buy the mobile device, e.g., a dollar value coupled with appropriate terms (e.g., offer lasts 24 hours, etc.). According to another example embodiment, the offer may comprise an insurance quote for a particular insurance policy. The processing circuitry 210, processor 212, memory 214, communication interface 218, support services controller 220, processing circuitry 310, processor 312, memory 314, communication interface 318, and/or mobile application controller 320 may, for example, provide means for performing operations 1560.

CONCLUSION

FIGS. 12-15 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory 214 and/or memory 314) storing instructions executable by a processor in the computing device (for example, by the processor 212 and/or processor 312). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, a mobile device support apparatus 102, a mobile device 104 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a mobile device 104 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

It will thus be appreciated by those skilled in the art that example embodiments of the present invention provide a substantial, technical contribution to the prior art and, in particular, solve a technical problem, namely, how to analyze and address faults associated with mobile devices in a way that is both accurate and intuitive. Moreover, example embodiments may provide further technical advantages, such as increasing device performance, reliability, and stability by providing intuitive tools for addressing potential device faults.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/ or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method comprising:
receiving device status data from a mobile device, wherein the device status data comprises information regarding one or more actions performed by a user of the mobile device prior to the support session being initiated, wherein the information regarding one or more actions performed by the user comprises at least one corrective action performed by the user and information regarding support information accessed by the user using one or more self-help tools, and wherein the device status information further comprises an indication of two or more applications installed on the mobile device;
determining, by a mobile device support apparatus, whether to escalate to a support session facilitated by a customer service representative based at least in part on the received device status data, based at least in part on a user sophistication level and a determination as to whether an escalation request generated in response to user selection of an escalation option was received, wherein the escalation option is presented via the mobile device;
if the determining whether to escalate results in the support session, selecting, by the mobile device support apparatus, a particular customer service representative from a plurality of customer service representatives to assign to the support session based at least in part on information regarding the plurality of customer support representatives and the at least one corrective action performed by the user, wherein the information regarding the plurality of customer service representatives comprises respective indications of the customer service representatives' experience with resolving faults arising from a particular device configuration;
assigning, by the mobile device support apparatus, the particular customer service representative to the support session; and
providing a record of the received device status data to the assigned customer service representative.

2. The method of claim 1, further comprising determining, based at least in part on the received device status data, the user sophistication level.

3. The method of claim 2, wherein determining the particular customer service representative is further based at least in part on the user sophistication level.

4. The method of claim 2, further comprising causing an indication of the user sophistication level to be provided to the particular customer support representative.

5. The method of claim 1, wherein the received device status data upon which the user sophistication level is determined comprises at least one of an application profile, a crash histories, support content accessed by the user of the mobile device, a rating of support content accessed by the user of the mobile device, or an indication of how frequently the user of the mobile device has accessed support content or engaged in a support session.

6. The method of claim 1, wherein the information regarding support information accessed by the user comprises one or more indications of the user's satisfaction with the accessed support information.

7. The method of claim 1, wherein the one or more corrective actions performed by the user comprise one or more actions performed in accordance with accessed support information.

8. The method of claim 1, wherein the information regarding the plurality of customer service representatives comprises at least one of: languages spoken, fault resolution times, fault resolution success rates, or customer feedback.

9. The method of claim 1, wherein determining the particular customer service representative comprises correlating the received device status data to the information regarding the plurality of customer support representatives.

10. The method of claim 1, further comprising determining, based at least in part on the received device status data, one or more potential faults related to the mobile device; and
wherein the information regarding the plurality of customer service representatives comprises respective indications of the customer service representatives' experience with resolving the one or more potential faults.

11. The method of claim 1, wherein the escalation option is presented via a support portal.

12. An apparatus comprising at least one processor and at least one memory having program code instructions embodied therein, the at least one memory and program code instructions being configured to, with the at least one processor, direct the apparatus to at least:
receive device status data from a mobile device, wherein the device status data comprises information regarding one or more actions performed by a user of the mobile device prior to the support session being initiated, wherein the information regarding one or more actions performed by the user comprises at least one corrective action performed by the user and information regarding support information accessed by the user using one or more self-help tools, and
wherein the device status information further comprises an indication of two or more applications installed on the mobile device;
determine whether to escalate to a support session facilitated by a customer service representative based at least in part on the received device status data, based at least in part on a user sophistication level and a determination as to whether an escalation request generated in response to user selection of an escalation option was received, wherein the escalation option is presented via the mobile device;
initiate, in an instance in which a determination is made to escalate, a support session with the mobile device;
select a particular customer service representative from a plurality of customer service representatives to assign to the support session based at least in part on information regarding the plurality of customer support representatives and the at least one corrective action performed by the user, wherein the information regarding the plurality of customer service representatives comprises respective indications of the customer service representatives' experience with resolving faults arising from a particular device configuration;
assign the particular customer service representative to the support session; and
provide a record of the received device status data to the assigned customer service representative.

13. The apparatus of claim 12, wherein the apparatus is further directed to determine, based at least in part on the received device status data, a user sophistication level.

14. A computer program product comprising a non-transitory computer-readable storage medium having program code portions stored therein, the program code portions being configured to, upon execution, direct an apparatus to at least:
receive device status data from a mobile device, wherein the device status data comprises information regarding one or more actions performed by a user of the mobile device prior to the support session being initiated, wherein the information regarding one or more actions performed by the user comprises at least one corrective action performed by the user and information regarding support information accessed by the user using one or more self-help tools, and wherein the device status information further comprises an indication of two or more applications installed on the mobile device;
determine whether to escalate to a support session facilitated by a customer service representative based at least in part on the received device status data, based at least in part on a user sophistication level and a determination as to whether an escalation request generated in response to user selection of an escalation option was received, wherein the escalation option is presented via the mobile device;
initiate, in an instance in which a determination is made to escalate, a support session with the mobile device;
select a particular customer service representative from a plurality of customer service representatives to assign to the support session based at least in part on information regarding the plurality of customer support representatives and the at least one corrective action performed by the user, wherein the information regarding the plurality of customer service representatives comprises respective indications of the customer service representatives' experience with resolving faults arising from a particular device configuration;
assign the particular customer service representative to the support session; and
provide a record of the received device status data to the assigned customer service representative.

15. A system comprising:
a mobile device comprising at least one first processor and at least one first memory having first program code instructions embodied therein, the at least one first memory and first program code instructions being configured to, with the at least one first processor, direct the mobile device to at least:
collect device status data, and
transmit the device status data;
a customer service center apparatus comprising at least one second processor and at least one second memory having second program code instructions embodied therein, the at least one second memory and second program code instructions being configured to, with the at least one second processor, direct the customer service center apparatus to at least:
receive the device status data from the mobile device, wherein the device status data comprises information regarding one or more actions performed by a user of the mobile device prior to a support session being initiated, wherein the information regarding one or more actions performed by the user comprises at least one corrective action performed by the user and information regarding support information accessed by the user using one or more self-help tools, and wherein the device status information further comprises an indication of two or more applications installed on the mobile device,
determine whether to escalate to a support session facilitated by a customer service representative based at least in part on the received device status data, based at least in part on a user sophistication level and a determination as to whether an escalation request generated in response to user selection of an escalation option was received, wherein the escalation option is presented via the mobile device,
initiate, in an instance in which a determination is made to escalate, the support session with the mobile device,
select a particular customer service representative from a plurality of customer service representatives to assign to the support session based at least in part on information regarding the plurality of customer support representatives and the at least one corrective action performed by the user, wherein the information regarding the plurality of customer service representatives comprises respective indications of the customer service representatives' experience with resolving faults arising from a particular device configuration,
assign the particular customer service representative to the support session, and
provide a record of the previously received status information to the assigned customer service representative.

\* \* \* \* \*